US009026573B2

(12) United States Patent
Lei et al.

(10) Patent No.: US 9,026,573 B2
(45) Date of Patent: May 5, 2015

(54) RECURSIVE TYPE-IV DISCRETE COSINE TRANSFORM SYSTEM

(75) Inventors: Sheau-Fang Lei, Tainan (TW);
Shin-Chi Lai, Kaohsiung (TW);
Wen-Chieh Tseng, Taipei (TW)

(73) Assignee: National Cheng Kung University, Tainan (TW)

( * ) Notice: Subject to any disclaimer, the term of this patent is extended or adjusted under 35 U.S.C. 154(b) by 477 days.

(21) Appl. No.: 13/557,462

(22) Filed: Jul. 25, 2012

(65) Prior Publication Data
US 2013/0173679 A1 Jul. 4, 2013

(30) Foreign Application Priority Data

Jan. 2, 2012 (TW) .............................. 101100102 A

(51) Int. Cl.
*G06F 17/14* (2006.01)
(52) U.S. Cl.
CPC .................................. *G06F 17/147* (2013.01)
(58) Field of Classification Search
CPC ..................................................... G06F 17/147
USPC .......................................................... 708/402
See application file for complete search history.

(56) References Cited

U.S. PATENT DOCUMENTS

| 8,631,060 B2* | 1/2014 | Reznik et al. ................. 708/400 |
| 2011/0150079 A1* | 6/2011 | Reznik et al. ............ 375/240.03 |
| 2012/0177108 A1* | 7/2012 | Joshi et al. ............... 375/240.03 |

OTHER PUBLICATIONS

Bi et al., "Fast Algorithms for Generalized Discrete Hartley Transform of Composite Sequence Lengths", IEEE, 2000, pp. 893-901.*

* cited by examiner

*Primary Examiner* — Chuong D Ngo
(74) *Attorney, Agent, or Firm* — Bacon & Thomas, PLLC

(57) ABSTRACT

A recursive type-IV discrete cosine transform system includes a first permutation device, a recursive type-III discrete cosine/sine transform device, a cosine/sine factor generation device, a recursive type-II discrete cosine/sine transform device, a second permutation device. The first permutation device performs two-dimensional order permutation operation on N digital signals for generating N two-dimensional first temporal signals. The recursive type-III discrete cosine/sine transform device repeats a type-III discrete cosine/sine transform for generating second temporal signals. The cosine/sine factor generation device sequentially performs cosine/sine factor multiplication and corresponding addition operations for generating third temporal signals. The recursive type-II discrete cosine/sine transform device repeats a type-II discrete cosine/sine transform for generating fourth temporal signals. The second permutation device performs a one-dimensional order permutation operation for generating N one-dimensional output signals. The N one-dimensional output signals are obtained by performing a type-IV discrete cosine transform on the N digital input signals.

11 Claims, 22 Drawing Sheets

RECURSIVE TYPE-IV DISCRETE COSINE TRANSFORM SYSTEM

CROSS REFERENCE TO RELATED APPLICATION

This application claims the benefits of the Taiwan Patent Application Serial Number 101100102, filed on Jan. 2, 2012, the subject matter of which is incorporated herein by reference.

BACKGROUND OF THE INVENTION

1. Field of the Invention

The present invention relates to the technical field of digital signal processing and, more particularly, to a recursive type-IV discrete cosine transform (DCT) system.

2. Description of Related Art

With the development of digital signal processing technologies, various messages and media information can be conveniently obtained in daily living. A variety of modified discrete cosine transforms (MDCTs) and inverse modified discrete cosine transforms (IMDCTs) are widely used in various audio codec standards.

The audio codec standards include MP3, AAC, AC-3, TwinVQ, Ogg, for example. The MDCT and IMDCT operations in an audio codec occupy a very large portion of the entire operational complexity. If the MDCT/IMDCT is implemented with a same approach, sharing the hardware can be achieved on design for reducing the hardware requirement and the MDCT/IMDCT operational complexity.

For a high-efficiency Advanced Audio Coding (HE-AAC) audio codec, it uses high-quality spectral band replication (HQ-SBR) or low-power spectral band replication (LP-SBR) technologies in which complex-domain analysis quadrature mirror filter-banks (complex AQMFs) and synthesis quadrature mirror filter-banks (complex SQMFs) can be derived as the DCT of type III (DCT-III) and DCT-II kernel methods. Therefore, for implementing an aspect of AQMF and SQMF co-architecture in design, in addition to the MDCT and IMDCT computation, the operation of DCT-IV/DCT-III/DCT-II supports is accounted an essential key in hardware design.

However, the typical recursive architecture for IMDCT implementations has the disadvantages of having numerous operational periods and the overtime computation and being difficult to implement a co-architecture design for different operations such as the MDCT, AQMF at a decoder and the SQMF at an encoder. When the typical recursive architecture requires increasing the bit rate, only the hardware or the timing can be increased. However, the increased hardware indicates to increase the cost, and the increased timing indicates the high power consumption. In addition, for concurrently having the MDCT, AQMF, SQMF operational capabilities, it needs to design different hardware architectures for the operations, which also indicates the additional cost for hardware design.

Although the recursive discrete Fourier transforms (RDFTs) have developed for many years and thus advanced, it is still required for further reducing the operational complexity and hardware cost and increasing the data computational performance.

Therefore, it is desirable to provide an improved RDFT system to mitigate and/or obviate the aforementioned problems.

SUMMARY OF THE INVENTION

The object of the present invention is to provide a recursive type-IV discrete cosine transform system, which has a low operational complexity, a low amount of used multiplication coefficients, and a high performance data computation.

According to a feature of the present invention, a recursive type-IV discrete cosine transform system is provided, which includes a first permutation device, a recursive type-III discrete cosine/sine transform device, a cosine/sine factor generation device, a recursive type-II discrete cosine/sine transform device, and a second permutation device. The first permutation device receives N digital input signals and performs a two-dimensional order permutation operation on the N digital signals for generating N two-dimensional first temporal signals, where N is a positive integer. The recursive type-III discrete cosine/sine transform device is an m-point recursive type-III discrete cosine/sine transform device connected to the first permutation device in order to receive the N first temporal signals and repeat a type-III discrete cosine/sine transform c times on the N first temporal signals for generating c second temporal signals each with m points, where N=m×c, and m, c are a positive integer. The cosine/sine factor generation device is connected to the recursive type-III discrete cosine/sine transform device in order to sequentially perform cosine/sine factor multiplication and corresponding addition operations on the m-point second temporal signals for generating c third temporal signals with m points. The recursive type-II discrete cosine/sine transform device is a c-point recursive type-II discrete cosine/sine transform device connected to the cosine/sine factor generation device in order to receive the third temporal signals and repeat a type-II discrete cosine/sine transform in times for generating m fourth temporal signals each with c points. The second permutation device is connected to the recursive type-II discrete cosine/sine transform device in order to receive the fourth temporal signals and perform a one-dimensional order permutation operation on the fourth temporal signals for generating N one-dimensional output signals, wherein the N one-dimensional output signals are obtained by performing a type-IV discrete cosine transform on the N digital input signals.

According to another feature of the present invention, a recursive type-IV discrete cosine transform system is provided, which includes a first permutation device, a modified recursive type-III discrete cosine/sine transform device, a recursive type-II discrete cosine/sine transform device, and a second permutation device. The first permutation device receives N digital input signals and performs a two-dimensional order permutation operation on the N digital signals for generating N two-dimensional first temporal signals, where N is a positive integer. The modified recursive type-III discrete cosine/sine transform device is connected to the first permutation device and has a first and a second operational modes such that in the first operational mode a type-III discrete cosine/sine transform is repeated c times on the N first temporal signals for generating c second temporal signals each with m points, where N=m×c, and m, c are a positive integer. The recursive type-II discrete cosine/sine transform device is connected to the modified recursive type-III discrete cosine/sine transform device and has a first and a second operational modes such that in the first operational mode a third temporal signal is received and a type-II discrete cosine/sine transform is repeated m times on the third temporal signal for generating m fourth temporal signals each with c points. The second permutation device is connected to the recursive type-II discrete cosine/sine transform device in order to receive the fourth temporal signals and perform a one-dimensional order permutation operation on the fourth temporal signals for generating N one-dimensional output signals, wherein the N one-dimensional output signals are obtained by performing a type-IV discrete cosine transform on the N digital input signals.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
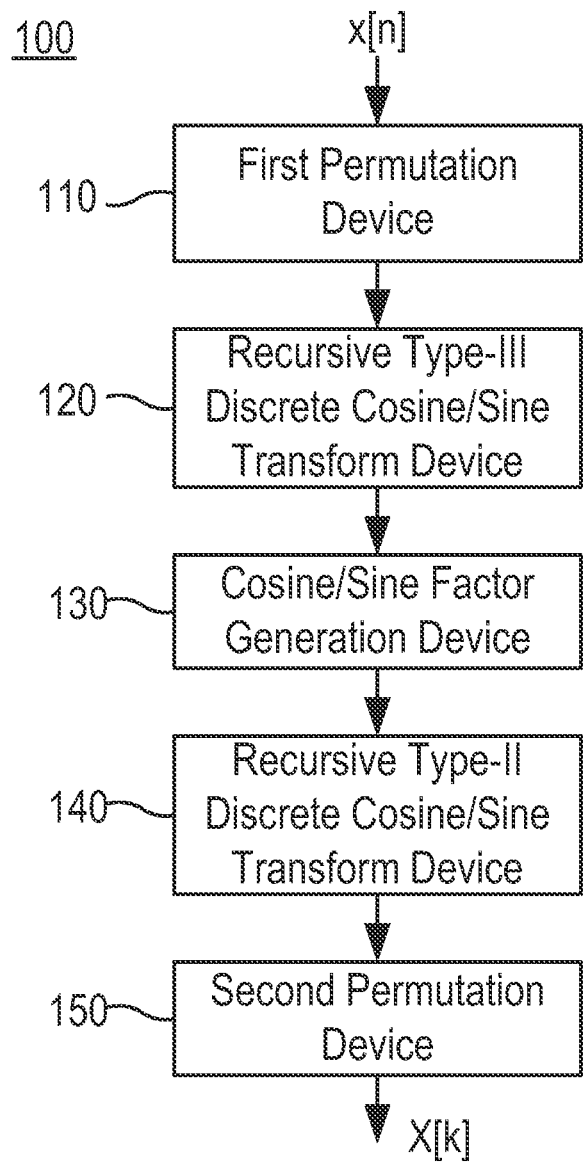
FIG. 1 is a schematic diagram of a recursive type-IV discrete cosine transform system according to an embodiment of the present invention.

FIG. 1 is a schematic diagram of a recursive type-IV discrete cosine transform system 100 according to an embodiment of the present invention. The system 100 includes a first permutation device 110, a recursive type-III discrete cosine/sine transform device 120, a cosine/sine factor generation device 130, a recursive type-II discrete cosine/sine transform device 140, and a second permutation device 150.

The first permutation device 110 receives N digital input signals and performs a two-dimensional order permutation operation on the N digital signals for generating N two-dimensional first temporal signals, where N is a positive integer.

The recursive type-III discrete cosine/sine transform device 120, which is an m-point recursive type-III discrete cosine/sine transform device, is connected to the first permutation device 110 in order to receive the N first temporal signals and repeat a type-III discrete cosine/sine transform c times on the N first temporal signals for generating c second temporal signals each with m points, where $N=m \times c$, and m, c are each a positive integer.

The cosine/sine factor generation device 130 is connected to the recursive type-III discrete cosine/sine transform device 120 in order to sequentially perform cosine/sine factor multiplication and corresponding addition operations on the m-point second temporal signals for generating c third temporal signals with m points.

The recursive type-II discrete cosine/sine transform device 140, which is a c-point recursive type-II discrete cosine/sine transform device, is connected to the cosine/sine factor generation device 130 in order to receive the third temporal signals and repeat a type-II discrete cosine/sine transform m times for generating m fourth temporal signals each with c points.

The second permutation device 150 is connected to the recursive type-II discrete cosine/sine transform device 140 in order to receive the fourth temporal signals and perform a one-dimensional order permutation operation on the fourth temporal signals for generating N one-dimensional output signals, wherein the N one-dimensional output signals are obtained by performing a type-IV discrete cosine transform (DCT-IV) on the N digital input signals.

For implementing a common architecture or co-architecture of analysis and synthesis filter-banks, the invention uses a DCT-IV kernel method to implement the modified DCT (MDCT) and inverse MDCT (IMDCT).

The MDCT and IMDCT math models are defined respectively in equation (1) and equation (2), where k ranges from zero to (N/2)−1, n ranges from zero to N−1, and M=N/2.

$$X_c[k] = \sum_{n=0}^{N-1} x[n] \times \cos\left(\frac{(2n+1+M)(2k+1)\pi}{2N}\right), \quad (1)$$

$$\hat{x}_c[n] = \sum_{k=0}^{\frac{N}{2}-1} X_c[k] \times \cos\left(\frac{(2n+1+M)(2k+1)\pi}{2N}\right). \quad (2)$$

After an order permutation, the above equations are rewritten as equation (3) and equation (4):

$$X_c[k] = \sum_{n=0}^{N/2-1} Pre_c[n] \times \cos\left(\frac{(2n+1)(2k+1)\pi}{2N}\right), \quad (3)$$

$$Post_c[n] = \sum_{k=0}^{N/2-1} X_c[k] \times \cos\left(\frac{(2n+1)(2k+1)\pi}{2N}\right), \quad (4)$$

where $$Pre_c[n] = -\left(x\left[n+\frac{3N}{4}\right] + x\left[\frac{3N}{4} - 1 - n\right]\right)\Big|_{n=0 \text{ to } N/4-1}$$

$$Pre_c[n] = \left(x\left[n-\frac{N}{4}\right] - x\left[\frac{3N}{4} - 1 - n\right]\right)\Big|_{n=N/4 \text{ to } N/2-1}, \quad (5)$$

$$Post_c[n]\Big|_{n=0 \text{ to } N/4-1} = -\hat{x}_c\left[\frac{3N}{4} - 1 - n\right] = -\hat{x}_c\left[n + \frac{3N}{4}\right]. \quad (6)$$

From equation (3) and equation (4), it is clearly known that the MDCT and IMDCT operation can be changed into a DCT-IV operation. In case of effectively sharing and reducing the DCT-IV operation, the computational complexity can be relatively reduced for the processes.

As compare with a parallel architecture, a recursive circuit has the advantages of small area, low power consumption, and flexible point number, but it also has the disadvantages of excess operational periods and overtime computation. For audio codec applications, such as long windows of Advanced Audio Coding (AAC; 2048 points), TwinVQ (4096 points), Ogg (up to 8192 points), the real-time computational requirement is difficult to be achieved due to the high point numbers.

Accordingly, the present invention applies a variable transform in a DCT-IV operation to thereby increase the speed of recursive architecture, and in this case an original one-dimensional computation equation is divided into two-dimensional operations to thereby shorten the cycle of a recursive operation.

An M-point DCT-IV math model is defined in equation (7) as follows.

$$X[k] = \sum_{n=0}^{M-1} x[n] \times \cos\left(\frac{(2n+1)(2k+1)\pi}{4M}\right), \quad (7)$$

where M=n×k. Assume $n=n_0+c\times n_1$ and $k=m\times k_0+k_1$, and plug it in equation (7), so $$X[m \times k_0 + k_1] = \sum_{n_0=0}^{c-1} \sum_{n_1=0}^{m-1} (-1)^{n_1 k_0} \times x[n_0 + c \times n_1] \times \quad (8)$$

$$\cos\left(\frac{(2k_1+1)n_1\pi}{2m} + \frac{(2n_0+1)(2k_1+1)\pi}{4M} + \frac{(2n_0+1)k_0\pi}{2c}\right),$$

$$X[m \times k_0 + k_1] = \sum_{n_0=0}^{c-1} \sum_{n_1=0}^{m-1} (-1)^{n_1 k_0} \times x[n_0 + c \times n_1] \times$$

$$\left\{\cos\left(\frac{(2n_0+1)k_0\pi}{2c}\right) \times \cos\left(\frac{(2k_1+1)n_1\pi}{2m} + \frac{(2n_0+1)(2k_1+1)\pi}{4M}\right) - \sin\left(\frac{(2n_0+1)k_0\pi}{2c}\right) \times \sin\left(\frac{(2k_1+1)n_1\pi}{2m} + \frac{(2n_0+1)(2k_1+1)\pi}{4M}\right)\right\} =$$

$$X_c[m \times k_0 + k_1] - X_s[m \times k_0 + k_1],$$

where $$X_c[m \times k_0 + k_1] = \quad (9)$$

$$\sum_{n_0=0}^{c-1} \cos\left(\frac{(2n_0+1)k_0\pi}{2c}\right) \sum_{n_1=0}^{m-1} (-1)^{n_1 k_0} \times x[n_0 + c \times n_1] \times$$

$$\cos\left(\frac{(2k_1+1)n_1\pi}{2m} + \frac{(2n_0+1)(2k_1+1)\pi}{4M}\right),$$

and $$X_s[m \times k_0 + k_1] = \quad (10)$$

$$\sum_{n_0=0}^{c-1} \sin\left(\frac{(2n_0+1)k_0\pi}{2c}\right) \sum_{n_1=0}^{m-1} (-1)^{n_1 k_0} \times x[n_0 + c \times n_1] \times$$

$$\sin\left(\frac{(2k_1+1)n_1\pi}{2m} + \frac{(2n_0+1)(2k_1+1)\pi}{4M}\right).$$

Upon the trigonometric functions' sum identities, Equation (3) can be expanded as:

$$X_c[m \times k_0 + k_1] = \quad (11)$$

$$\sum_{n_0=0}^{c-1} \cos\left(\frac{(2n_0+1)k_0\pi}{2c}\right) \sum_{n_1=0}^{m-1} (-1)^{n_1 k_0} \times x[n_0 + c \times n_1] \times$$

$$\left\{\cos\left(\frac{(2n_0+1)(2k_1+1)\pi}{4M}\right) \times \cos\left(\frac{(2k_1+1)n_1\pi}{2m}\right) - \sin\left(\frac{(2n_0+1)(2k_1+1)\pi}{4M}\right) \times \sin\left(\frac{(2k_1+1)n_1\pi}{2m}\right)\right\} =$$

$$\sum_{n_0=0}^{c-1} \cos\left(\frac{(2n_0+1)k_0\pi}{2c}\right)$$

$$\left\{\left[\sum_{n_1=0}^{m-1} (-1)^{n_1 k_0} \times x[n_0 + c \times n_1] \times \cos\left(\frac{(2k_1+1)n_1\pi}{2m}\right)\right] \times \cos\left(\frac{(2n_0+1)(2k_1+1)\pi}{4M}\right)\right] - \left[\sum_{n_1=0}^{m-1} (-1)^{n_1 k_0} \times x[n_0 + c \times n_1]\sin\left(\frac{(2k_1+1)n_1\pi}{2m}\right) \times \sin\left(\frac{(2n_0+1)(2k_1+1)\pi}{4M}\right)\right]\right\} =$$

$$X_{c0}[m \times k_0 + k_1] - X_{c1}[m \times k_0 + k_1],$$

-continued where $$X_{c0}[m \times k_0 + k_1] = \quad (12)$$

$$\sum_{n_0=0}^{c-1} \sum_{n_1=0}^{m-1} (-1)^{n_1 k_0} \times x[n_0 + c \times n_1] \times \cos\left(\frac{(2k_1+1)n_1\pi}{2m}\right) \times$$

$$\cos\left(\frac{(2n_0+1)(2k_1+1)\pi}{4M}\right) \times \cos\left(\frac{(2n_0+1)k_0\pi}{2c}\right),$$

and $$X_{c1}[m \times k_0 + k_1] = \quad (13)$$

$$\sum_{n_0=0}^{c-1} \sum_{n_1=0}^{m-1} (-1)^{n_1 k_0} \times x[n_0 + c \times n_1] \times \sin\left(\frac{(2k_1+1)n_1\pi}{2m}\right) \times$$

$$\sin\left(\frac{(2n_0+1)(2k_1+1)\pi}{4M}\right) \times \cos\left(\frac{(2n_0+1)k_0\pi}{2c}\right).$$

Similarly, upon the trigonometric functions' sum identities, Equation (10) can be expended as:

$$X_s[m \times k_0 + k_1] = \quad (14)$$

$$\sum_{n_0=0}^{c-1} \sin\left(\frac{(2n_0+1)k_0\pi}{2c}\right) \sum_{n_1=0}^{m-1} (-1)^{n_1 k_0} \times x[n_0 + c \times n_1] \times$$

$$\left\{\sin\left(\frac{(2n_0+1)(2k_1+1)\pi}{4M}\right) \times \cos\left(\frac{(2k_1+1)n_1\pi}{2m}\right) + \cos\left(\frac{(2n_0+1)(2k_1+1)\pi}{4M}\right) \times \sin\left(\frac{(2k_1+1)n_1\pi}{2m}\right)\right\} =$$

$$\sum_{n_0=0}^{c-1} \sin\left(\frac{(2n_0+1)k_0\pi}{2c}\right) \left\{\left[\sum_{n_1=0}^{m-1} (-1)^{n_1 k_0} \times x[n_0 + c \times n_1] \times \sin\left(\frac{(2n_0+1)(2k_1+1)\pi}{4M}\right) \times \cos\left(\frac{(2k_1+1)n_1\pi}{2m}\right)\right] + \left[\sum_{n_1=0}^{m-1} (-1)^{n_1 k_0} \times x[n_0 + c \times n_1] \times \cos\left(\frac{(2n_0+1)(2k_1+1)\pi}{4M}\right) \times \sin\left(\frac{(2k_1+1)n_1\pi}{2m}\right)\right]\right\} =$$

$$X_{s0}[m \times k_0 + k_1] + X_{s1}[m \times k_0 + k_1],$$

where $$X_{s0}[m \times k_0 + k_1] = \quad (15)$$

$$\sum_{n_0=0}^{c-1} \sum_{n_1=0}^{m-1} (-1)^{n_1 k_0} \times x[n_0 + c \times n_1] \times \cos\left(\frac{(2k_1+1)n_1\pi}{2m}\right) \times$$

$$\sin\left(\frac{(2n_0+1)(2k_1+1)\pi}{4M}\right) \times \sin\left(\frac{(2n_0+1)k_0\pi}{2c}\right),$$

and $$X_{s1}[m \times k_0 + k_1] = \quad (16)$$

$$\sum_{n_0=0}^{c-1} \sum_{n_1=0}^{m-1} (-1)^{n_1 k_0} \times x[n_0 + c \times n_1] \times \sin\left(\frac{(2k_1+1)n_1\pi}{2m}\right) \times$$

$$\cos\left(\frac{(2n_0+1)(2k_1+1)\pi}{4M}\right) \times \sin\left(\frac{(2n_0+1)k_0\pi}{2c}\right).$$

By considering a change of the index $k_0$, the kernel operation in equation (12), equation (13), equation (15), equation (16) is defined as:

$$A(n_0, k_1, k_0) = \sum_{n_1=0}^{m-1} (-1)^{n_1 k_0} \times x[n_0 + c \times n_1] \times \cos\left(\frac{(2k_1+1)n_1\pi}{2m}\right), \quad (17)$$

$$B(n_0, k_1, k_0) = \sum_{n_1=0}^{m-1} (-1)^{n_1 k_0} \times x[n_0 + c \times n_1] \times \sin\left(\frac{(2k_1+1)n_1\pi}{2m}\right). \quad (18)$$

If $k_0$ is an odd number, $$A(n_0, k_1, 1) = \sum_{n_1=0}^{m-1} (-1)^{n_1} \times x[n_0 + c \times n_1] \times \cos\left(\frac{(2k_1+1)n_1\pi}{2m}\right), \quad (19)$$

$$B(n_0, k_1, 1) = \sum_{n_1=0}^{m-1} (-1)^{n_1} \times x[n_0 + c \times n_1] \times \sin\left(\frac{(2k_1+1)n_1\pi}{2m}\right). \quad (20)$$

If $k_0$ is an even number, $$A(n_0, k_1, 0) = \sum_{n_1=0}^{m-1} x[n_0 + c \times n_1] \times \cos\left(\frac{(2k_1+1)n_1\pi}{2m}\right), \quad (21)$$

$$B(n_0, k_1, 0) = \sum_{n_1=0}^{m-1} x[n_0 + c \times n_1] \times \sin\left(\frac{(2k_1+1)n_1\pi}{2m}\right). \quad (22)$$

From equation (19) and equation (21), it is known that the change of $k_0$ only has two types of $A(n_0, k_1, 1)$ and $A(n_0, k_1, 0)$ with respect to $A(n_0, k_1, k_0)$. Similarly, from equation (20) and equation (22), it is known that the change of $k_0$ only has two types of $B(n_0, k_1, 1)$ and $B(n_0, k_1, 0)$ with respect to $B(n_0, k_1, k_0)$. Such a feature can relatively reduce the computational amount of Equation (17) and Equation (18).

Let $k_1 = m-1-k_1$, and plug it in equation (19) to thereby derive the relation between equation (19) and equation (21), so as to have:

$$A(n_0, m-1-k_1, 1) = \sum_{n_1=0}^{m-1} (-1)^{n_1} \times x[n_0 + c \times n_1] \times \quad (23)$$

$$\cos\left(n_1\pi + \frac{(2k_1+1)n_1\pi}{2m}\right)$$

$$= \sum_{n_1=0}^{m-1} (-1)^{2n_1} \times x[n_0 + c \times n_1] \times$$

$$\cos\left(\frac{(2k_1+1)n_1\pi}{2m}\right)$$

$$= \sum_{n_1=0}^{m-1} x[n_0 + c \times n_1] \times \cos\left(\frac{(2k_1+1)n_1\pi}{2m}\right)$$

$$= A(n_0, k_1, 0).$$

Similarly, let $k_1 = m-1-k_1$, and plug it in Equation (20) to thereby derive the relation between Equation (20) and Equation (22), so $$B(n_0, m-1-k_1, 1) = \sum_{n_1=0}^{m-1} (-1)^{n_1} \times x[n_0 + c \times n_1] \times \qquad (24)$$
$$\sin\left(n_1\pi + \frac{(2k_1+1)n_1\pi}{2m}\right)$$
$$= \sum_{n_1=0}^{m-1} (-1)^{2n_1+1} \times x[n_0 + c \times n_1] \times$$
$$\sin\left(\frac{(2k_1+1)n_1\pi}{2m}\right)$$
$$= -\sum_{n_1=0}^{m-1} x[n_0 + c \times n_1] \times \sin\left(\frac{(2k_1+1)n_1\pi}{2m}\right)$$
$$= -B(n_0, k_1, 0).$$

Accordingly, from equation (23) and equation (24), we have:

$$A(n_0, k_1, 1) = A(n_0, m-1-k_1, 0) \qquad (25)$$

$$B(n_0, k_1, 1) = -B(n_0, m-1-k_1, 0). \qquad (26)$$

By means of equation (25) and equation (26), the operations of equation (19) and equation (20) can be simplified.

By plugging the results in equation (12), equation (13), equation (15), equation (16), we have:

$$X_{c0}[m \times k_0 + k_1] = \qquad (27)$$
$$\sum_{n_0=0}^{c-1} A(n_0, k_1, k_0) \times \cos\left(\frac{(2n_0+1)(2k_1+1)\pi}{4M}\right) \times \cos\left(\frac{(2n_0+1)k_0\pi}{2c}\right),$$

$$X_{c1}[m \times k_0 + k_1] = \qquad (28)$$
$$\sum_{n_0=0}^{c-1} B(n_0, k_1, k_0) \times \sin\left(\frac{(2n_0+1)(2k_1+1)\pi}{4M}\right) \times \cos\left(\frac{(2n_0+1)k_0\pi}{2c}\right),$$

$$X_{s0}[m \times k_0 + k_1] = \qquad (29)$$
$$\sum_{n_0=0}^{c-1} A(n_0, k_1, k_0) \times \sin\left(\frac{(2n_0+1)(2k_1+1)\pi}{4M}\right) \times \sin\left(\frac{(2n_0+1)k_0\pi}{2c}\right),$$

$$X_{s1}[m \times k_0 + k_1] = \qquad (30)$$
$$\sum_{n_0=0}^{c-1} B(n_0, k_1, k_0) \times \cos\left(\frac{(2n_0+1)(2k_1+1)\pi}{4M}\right) \times \sin\left(\frac{(2n_0+1)k_0\pi}{2c}\right).$$

Since $$X[m \times k_0 + k_1] = X_c[m \times k_0 + k_1] - X_s[m \times k_0 + k_1]$$
$$= (X_{c0}[m \times k_0 + k_1] - X_{c1}[m \times k_0 + k_1]) -$$
$$(X_{s0}[m \times k_0 + k_1] + X_{s1}[m \times k_0 + k_1]),$$

we have:

$$X_c[m \times k_0 + k_1] = \sum_{n_0=0}^{c-1} T_c(n_0, k_1, k_0) \times \cos\left(\frac{(2n_0+1)k_0\pi}{2c}\right), \qquad (31)$$

and $$T_c(n_0, k_1, k_0) - A(n_0, k_1, k_0) \times \cos\left(\frac{(2n_0+1)(2k_1+1)\pi}{4M}\right) - \qquad (32)$$
$$B(n_0, k_1, k_0) \times \sin\left(\frac{(2n_0+1)(2k_1+1)\pi}{4M}\right).$$

while $$X_s[m \times k_0 + k_1] = \sum_{n_0=0}^{c-1} T_s(n_0, k_1, k_0) \times \sin\left(\frac{(2n_0+1)k_0\pi}{2c}\right), \qquad (33)$$

and $$T_s(n_0, k_1, k_0) - A(n_0, k_1, k_0) \times \sin\left(\frac{(2n_0+1)(2k_1+1)\pi}{4M}\right) + \qquad (34)$$
$$B(n_0, k_1, k_0) \times \cos\left(\frac{(2n_0+1)(2k_1+1)\pi}{4M}\right).$$

By summarizing the derivations, it is seen that the input signals pass through the DCT-II process of equation (21) and the DCT-III process of equation (22), then are multiplied by the respective cosine and sine factors in equation (32) and equation (34), and finally pass through the DCT-II process of equation (31) and the DCT-II process of equation (33). Thus, the faster DCT-IV operation is obtained.

Let $n=0 \sim M-1$, $k=0 \sim M-1$, $M=m \times c$, $n_0=0 \sim c-1$, $k_0=0 \sim c-1$, $n_1=0 \sim m-1$, and $k_1=U \sim m-1$, the complete M-point DCT-IV method can be written into the steps as follows.

1. The input signals are based on $n=n_0+c \times n_1$ to be arranged as a two-dimensional order permutation.
2. The arranged data (the permutation) is input to an m-point DCT-III/DST-III hardware.
3. The resultant transformed by the m-point DCT-III/DST-II hardware is operated with the cosine and sine factors.
4. The resultant after the operation is input to a c-point DCT-III/DST-III hardware.
5. The results transformed by the c-point DCT-III and DST-III hardware are subtracted and permuted based on $k=m \times k_0+k_1$.

Figure 2:
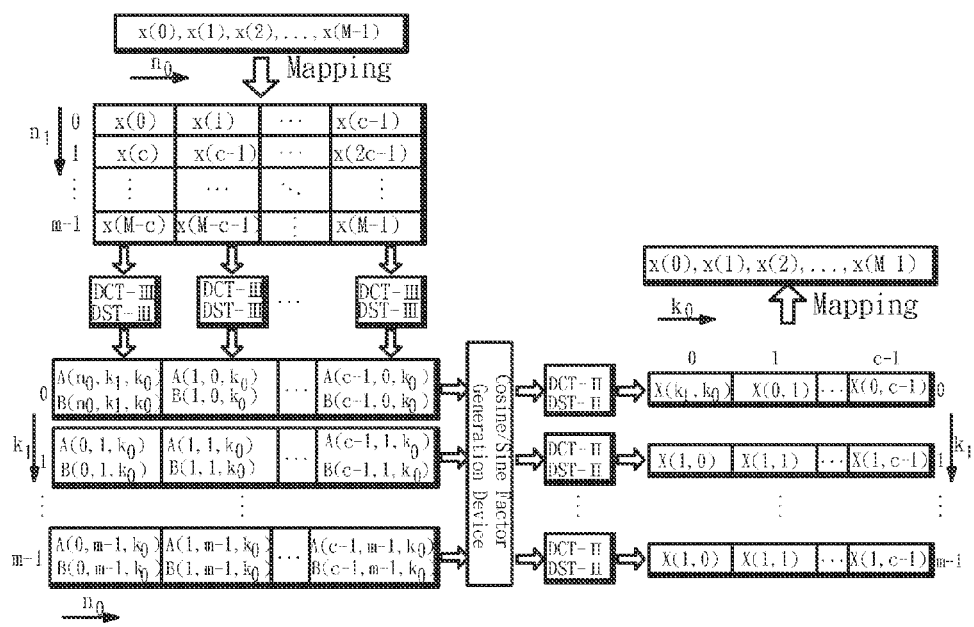
FIG. 2 is a schematic diagram of a DCT-IV (discrete cosine transform of type-IV) operation according to an embodiment of the present invention.

Steps (1) and (5), which are regarded as pre- and post-processing, essentially perform the permutation, addition, and subtraction operations, and steps (2)-(4) are the operations of the kernel hardware architecture. The steps above are shown in FIG. 2 in which is a schematic diagram of a DCT-IV (discrete cosine transform of type-IV) operation according to an embodiment of the embodiment. In addition, in FIG. 2, it is easy to see that step (2) requires repeating the m-point DCT-III/DST-III c times. In this case, c DCT-III/DST-III circuits are required in case of only using the hardware in implementation. Such an implementation requires more hardware sources and is difficult to adjust the hardware resources for different points. Therefore, for supporting multiple audio standards with different points, the invention uses a DCT-III/DST-III hardware to repeat the operation c times, and for different points, only the number of operations is adjusted. Similarly, step (4) requires repeating the c-point DCT-II/DST-II operation m times, and it is implemented by repeating the operation m times on a DCT-II/DST-II hardware.

As cited above, the invention divides the M-point DCT-IV operation into an m-point DCT-III/DST-III operation and a c-point DCT-II/DST-II operation. In viewing FIG. 2, it is seen that the result of the m-point DCT-III/DST-III operation is operated with the cosine and sine factors to thereby become an input data for the c-point DCT-II/DST-II operation. Therefore, the complete architecture can be generally divided into three stages, the first stage indicating the m-point DCT-III/DST-III operation, the immediate stage indicating the cosine and sine factor operation, and the second stage indicating the c-point DCT-II/DST-II operation. Thus, the invention can arrange a sequence of data operations for allowing each stage to independently perform and increasing the performance in a pipelined form.

Figure 3:
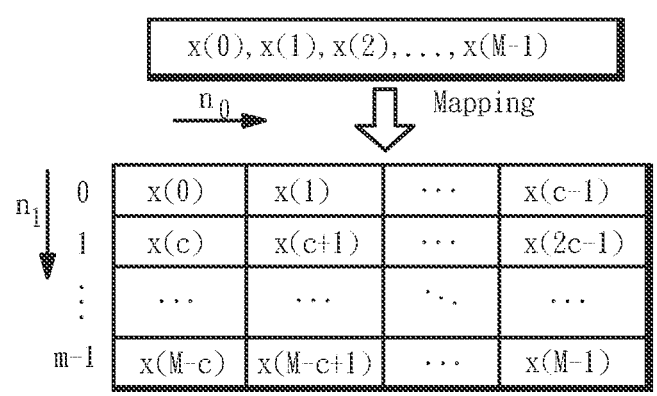
FIG. 3 is a schematic diagram of input data mapping according to an embodiment of the present invention.
Figure 4:
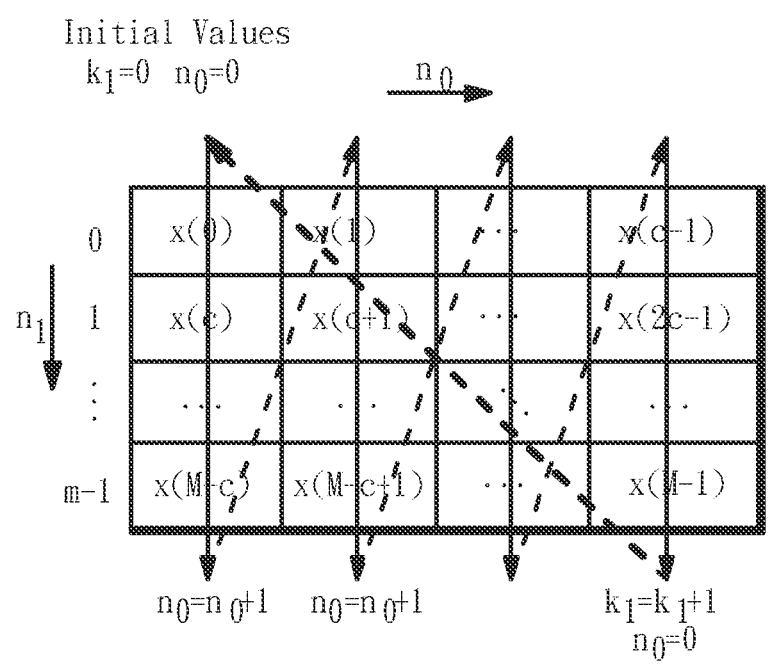
FIG. 4 is a schematic diagram of a relationship between indexes $n_0$, $k_1$ according to an embodiment of the present invention.
Figure 5:
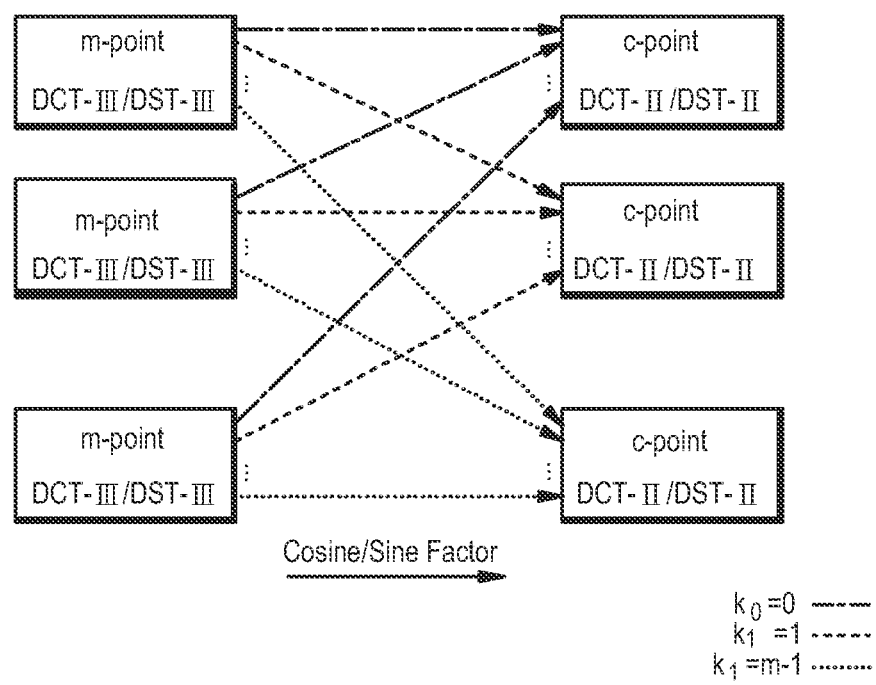
FIG. 5 is a schematic diagram of a relationship between an m-point DCT-III/DST-III and a c-point DCT-II/DST-II according to an embodiment of the present invention.

At first, the input data of the sequence is arranged into a two-dimensional order permutation based on $n=n_0+c\times n_1$, as shown in FIG. 3 in which is a schematic diagram of input data mapping according to an embodiment of the embodiment. Next, the computational order firstly sets $k_1$, $n_o$ to a respective initial value, then adds $n_o$ by one after an m-time recursion, and finally repeats the addition until $n_o=c-1$, which indicates that the c m-point DCT-III/DST-III operations are complete. Next, the c results can be delivered to a next-stage for performing c-point DCT-II/DST-II operations, adding $k_1$ by one, and setting $n_o$, to zero, as shown in FIG. 4 in which is a schematic diagram of the relationship between the indexes $n_0$, $k_1$ according to an embodiment of the embodiment. As cited above, it is known that such an operation can make the data streams independent, so the pipeline can work completely, as shown in FIG. 5 in which is a schematic diagram of the relationship between the m-point DCT-II/DST-III and the c-point DCT-II/DST-II operations according to an embodiment of the embodiment.

Figure 6:
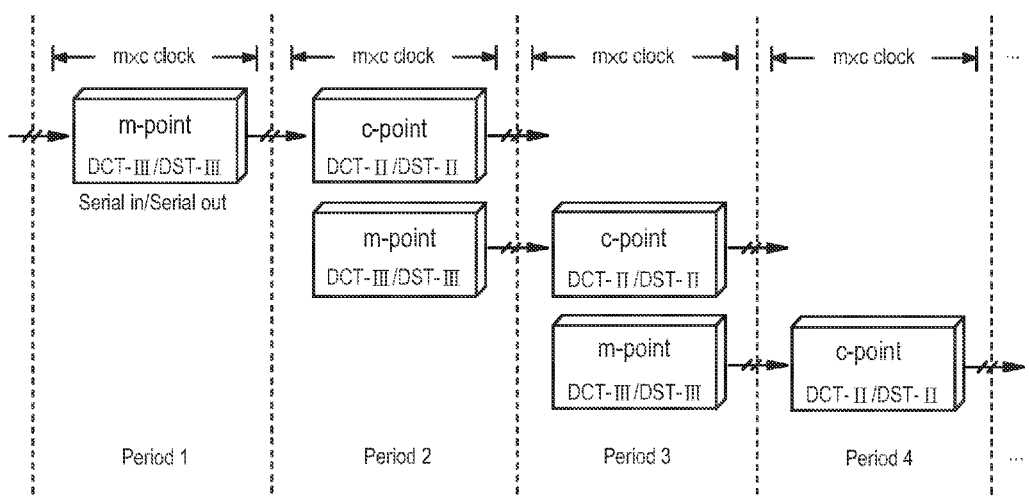
FIG. 6 is a schematic diagram of a pipelined DCT-IV according to an embodiment of the present invention.

The duration required for a pipeline depends on which stage of circuit requires the highest time in operation. In practice, the operating speed of the first stage has to be smaller than or equal to that of the second stage, i.e., m≥c. In addition, when m=c, the pipeline can achieve the optimal efficiency. FIG. 6 is a schematic diagram of a pipelined DCT-IV according to an embodiment of the present invention.

With the pipelined scheme, the number of cycles is improved by c times as compared with the conventional method. However, a certain number of registers are relatively increased for an exchange. Since the data transfer between the stages requires the registers for storing, the number of registers required for the architecture is determined by c. Namely, the number of registers is increased with increasing the multiple of speeding.

Upon FIG. 2, the DCT-II/DST-III hardware architecture is designed. The design is focused on how to provide a recursive DCT-III/DST-III hardware architecture with a low operational period to thereby improve the slow-speed recursive architecture in the prior art. In addition, on the hardware design, the sharing scheme is expected, which can allow the designed hardware to concurrently have the DCT-III and DST-III operational capabilities to thereby reduce the hardware cost.

Equation (35) and Equation (36) are defined as m-point DCT-III and DST-III math models respectively. For input signals $y[n_1]$ and $z[n]$ and output signals $Y_{DCT-III}[k_1]$ and $Z_{DCT-III}[k_1]$, $n_1=0\sim m-1$, $k_1=0\sim m-1$, $$Y_{DCT-III}[k_1] = \sum_{n_1=0}^{m-1} y[n_1] \times \cos\left(\frac{(2k_1+1)n_1\pi}{2m}\right), \quad (35)$$

$$Z_{DST-III}[k_1] = \sum_{n_1=0}^{m-1} z[n_1] \times \sin\left(\frac{(2k_1+1)n_1\pi}{2m}\right). \quad (36)$$

For different applications, the m-point number can be odd or even, which is separately discussed as follows.

(A) m is an Odd Number

If m is an odd number, Equation (35) is rewritten as Equation (37), Equation (38), and Equation (39):

$$Y_{DCT-III}[k_1] = \sum_{n_1=0}^{m-1} y[n_1] \times \cos\left(\frac{(2k_1+1)n_1\pi}{2m}\right), \quad (37)$$

for $k_1 = 0 \sim (m-3)/2$, $$Y_{DCT-III}[m-1-k_1] = \sum_{n_1=0}^{m-1} (-1)^{n_1} \times y[n_1] \times \cos\left(\frac{(2k_1+1)n_1\pi}{2m}\right), \quad (38)$$

for $k_1 = 0 \sim (m-3)/2$, $$Y_{DCT-III}[(m-1)/2] = y[0] - y[2] + y[4] - y[6] +, \ldots, -y[m-1]. \quad (39)$$

Figure 7:
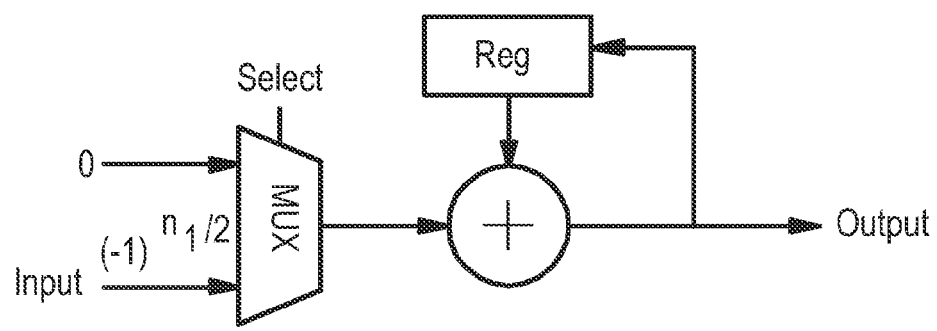
FIG. 7 is a schematic diagram of using additional adder and registers according to an embodiment of the present invention.
Figure 9:
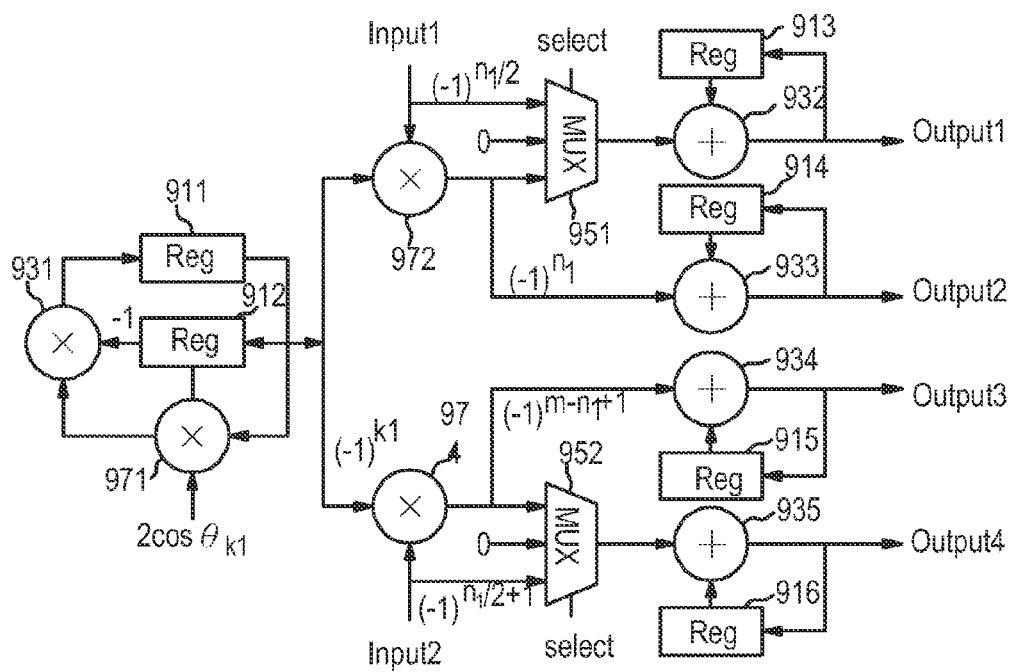
FIG. 9 is a schematic diagram of a DCT-III/DST-III hardware architecture according to an embodiment of the present invention.

From equation (37), equation (38), and equation (39), it is known that the data throughput per transformation (DTPT) in equation (35) is doubled, so that only $m\times(m-1)/2$ cycles are required for completing the m-point DCT-III computation, but the operation in equation (39) requires using additional adders and registers, as shown in FIG. 7 in which is a schematic diagram of using the additional adder and registers according to an embodiment of the embodiment. In this case, when the operation in equation (39) is implemented with a common hardware, as shown in FIG. 9 in which is a schematic diagram of the DCT-III/DST-III hardware architecture according to an embodiment of the present invention, the computational period to be required for DCT-III includes $m\times(m+1)/2$ cycles.

Similarly, equation (36) can be rewritten as equation (40), equation (41), and equation (42).

$$z_{DST-III}[k_1] = \sum_{n_1=0}^{m-1} z[n_1] \times \sin\left(\frac{(2k+1)n_1\pi}{2m}\right), \quad (40)$$

for $k_1 = 0 \sim (m-3)/2$, $$Z_{DST-III}[m-1-k_1] = \sum_{n_1=0}^{m-1} (-1)^{n_1+1} \times z[n_1] \times \sin\left(\frac{(2k+1)n_1\pi}{2m}\right), \quad (41)$$

for $k_1 = 0 \sim (m-3)/2$, $$Z_{DST-III}[(m-1)/2] = z[1] - y[3] + y[5] - y[7] +, \ldots, +y[m-2]. \quad (42)$$

Figure 8:
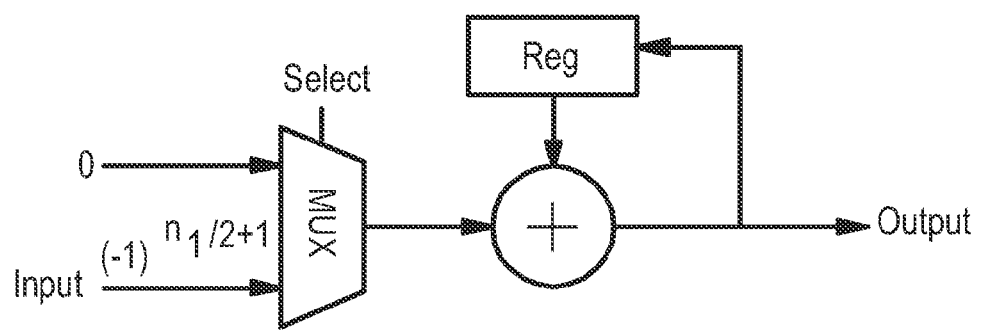
FIG. 8 is a schematic diagram of using additional adder and registers according to an embodiment of the present invention.

From equation (40), equation (41), and equation (42), it is known that the DTPT in equation (36) is doubled, so only $m\times(m-1)/2$ cycles are required for completing the m-point DCT-III computation, but the operation in equation (42) requires using additional adders and registers, as shown in FIG. 8 in which is a schematic diagram of using the additional adder and registers according to an embodiment of the embodiment. In this case, when the operation in equation (42) is implemented with a common hardware, as shown in FIG. 9, the computational period to be required for DCT-III includes $m\times(m+1)/2$ cycles.

Next, for allowing DST-III and DCT-III to share the cosine coefficients, Equation (43) is derived from Equation (40), and Equation (44) is derived from Equation (41).

$$Z_{DST-III}[k_1] = (-1)^{k_1} \times \sum_{n_1=0}^{m-1} z[m-n_1] \times \cos\left(\frac{(2k_1+1)n_1\pi}{2m}\right), \quad (43)$$

for $k_1 = 0 \sim (m-3)/2$.

-continued $$Z_{DST-III}[m-1-k_1] = \qquad (44)$$

$$(-1)^{k_1} \times \sum_{n_1=0}^{m-1} (-1)^{m-n_1+1} \times z[m-n_1] \times \cos\left(\frac{(2k_1+1)n_1\pi}{2m}\right),$$

for $k_1 = 0 \sim (m-3)/2$.

From Equation (43) and Equation (44), it is known that the cosine coefficients for DCT-II can be shared by simply ordering the input signals for DST-III and adjusting the positive and negative signs to thereby produce the operational result for DST-III and save the hardware cost.

(B) m is an Even Number:

If m is an even number, equation (35) can be rewritten as equation (45) and equation (46):

$$Y_{DCT-III}[k_1] = \sum_{n_1=0}^{m-1} y[n_1] \times \cos\left(\frac{(2k_1+1)n_1\pi}{2m}\right), \qquad (45)$$

for $k_1 = 0 \sim (m-1)/2$.

$$Y_{DCT-III}[m-1-k_1] = \sum_{n_1=0}^{m-1} (-1)^{n_1} \times y[n_1] \times \cos\left(\frac{(2k_1+1)n_1\pi}{2m}\right), \qquad (46)$$

for $k_1 = 0 \sim (m-1)/2$.

From equation (45) and equation (46), it is known that the DTPT in equation (35) is doubled, so only $m^2/2$ cycles are required for completing the m-point DST-III computation.

Similarly, equation (36) can be rewritten as equation (47) and equation (48):

$$Z_{DST-III}[k_1] = \sum_{n_1=0}^{m-1} z[n_1] \times \sin\left(\frac{(2k_1+1)n_1\pi}{2m}\right), \text{ for } k_1 = 0 \sim (m-1)/2. \qquad (47)$$

$$Z_{DST-III}[m-1-k_1] = \sum_{n_1=0}^{m-1} (-1)^{n_1+1} \times z[n_1] \times \sin\left(\frac{(2k_1+1)n_1\pi}{2m}\right), \qquad (48)$$

for $k_1 = 0 \sim (m-1)/2$.

Next, for allowing DST-III and DCT-III to share the cosine coefficients, equation (49) is derived from equation (47), and equation (50) is derived from equation (48):

$$Z_{DST-III}[k_1] = (-1)^{k_1} \times \sum_{n_1=0}^{m-1} z[m-n_1] \times \cos\left(\frac{(2k_1+1)(m-n_1)\pi}{2m}\right), \qquad (49)$$

for $k_1 = 0 \sim (m-1)/2$.

$$Z_{DST-III}[m-1-k_1] = \qquad (50)$$

$$(-1)^{k_1} \times \sum_{n_1=0}^{m-1} (-1)^{(m-n_1+1)} \times z[m-n_1] \times \cos\left(\frac{(2k_1+1)n_1\pi}{2m}\right),$$

for $k_1 = 0 \sim (m-1)/2$.

From equation (49) and equation (50), it is known that the cosine coefficients for DCT-III can be shared by simply ordering the input signals for DST-III and adjusting the positive and negative signs to thereby produce the operational result for DST-III and save the hardware cost.

Finally, upon equation (51) and equation (52), the Chebyshev polynomials are:

$$\cos(n_1\theta_{k_2}) = 2\cos(\theta_{k_1})\cos((n_1-1)\theta_{k_1}) - \cos((n_1-2)\theta_{k_2}), \qquad (51)$$

$$\sin(n_1\theta_{k_1}) = 2\cos(\theta_{k_2})\sin((n_1-1)\theta_{k_2}) - \sin((n_1-2)\theta_{k_1}), \qquad (52)$$

where $$\theta_{k_1} = \frac{(2k_1+1)\pi}{2m}.$$

Expanding the Chebyshev polynomials, we have:

$$\cos\left(\frac{(2k_1+1)n_1\pi}{2m}\right) = 2 \times \cos\left(\frac{(2k_1+1)\pi}{2m}\right)\cos\left(\frac{(2k_1+1)(n_1-1)\pi}{2m}\right) - \cos\left(\frac{(2k_1+1)(n_1-2)\pi}{2m}\right). \qquad (53)$$

The initial values, $\cos((2k_1+1)\pi/2m)$, 1, $\cos((2k_1+1)(-1)\pi/2m)$, respectively for three cosine functions at the right side of the equality in equation (53) in the invention can be obtained by plugging $n_1=1$.

Since $\cos((2k_1+1)(-1)\pi/2m) = \cos((2k_1+1)\pi/2m)$, the cosine coefficients with a same k1 and different n1 can be generated by the recursive operation in equation (53), with accessing $\cos((2k_1+1)\pi/2m)$ and the memory requirement of m words only.

Next, plugging equation (53) in equation (37), equation (38), equation (43), equation (44), equation (45), equation (46), the method with the low operation cycle and DCT-III/DST-III operational capabilities is obtained. In addition, the operations in equation (39) and equation (50) require addition only, which can be implemented by the common adders with other operations. In this case, the hardware architecture is designed as that shown in FIG. 9.

In FIG. 9, $y[n_1]$ indicates the input signal Input1, and $z[n_1]$ indicates the input signal Input2.

When m is an odd number, the output signal Output1 corresponds to the result operated in equation (37) or equation (39), the output signal Output2 corresponds to the result operated in equation (38), the output signal Output3 corresponds to the result operated in equation (44), and the output signal Output4 corresponds to the result operated in equation (43) or equation (42).

When m is an even number, the output signal Output1 corresponds to the result operated in equation (45), the output signal Output2 corresponds to the result operated in equation (46), the output signal Output3 corresponds to the result operated in equation (48), and the output signal Output4 corresponds to the result operated in equation (47). The parameters corresponding to the output signals in FIG. 9 are shown in Table 5.3.1 as follows.

TABLE 5.3.1

DCT-III/DST-III hardware and method relative table

| Hardware I/O | Corresponding Parameters |
| --- | --- |
| Input1 | $x(n_0, n_1)$ |
| Input2 | $x(n_0, m - n_1)$ |
| Output1 | $A(n_0, k_1, 0), A(n_0, m - 1 - k_1, 1)$ |
| Output2 | $A(n_0, m - 1 - k_1, 0), A(n_0, k_1, 1)$ |
| Output3 | $B(n_0, m - 1 - k_1, 0), -B(n_0, k_1, 1)$ |
| Output4 | $B(n_0, k_1, 0), -B(n_0, m - 1 - k_1, 1)$ |

P.S.: $n_0 = 0 \sim c - 1$, $n_1 = 0 \sim m - 1$, $k_1 = 0 \sim (m+1)/2$ when m is an odd number, and $k_1 = 0 \sim m/2$ when m is an even number.

As cited above, the recursive type-III discrete cosine/sine transform device 120 is implemented by sharing the hardware, and the computational period includes m×(m+1)/2 cycles.

As shown in FIG. 9, the recursive type-II discrete cosine/sine transform device 120 includes first to sixth registers 901-906, first to fifth adders 931-935, a first 3-to-1 multiplexer 951, a second 3-to-1 multiplexer 952, a first multiplier 971, a second multiplier 972, and a fourth multiplier 974.

Upon FIG. 2, the DCT-II/DST-II hardware architecture is designed. The design is focused on how to provide a recursive DCT-II/DST-II hardware architecture with a low operational period to thereby improve the slow-speed recursive architecture in the prior art. In addition, on the hardware design, the sharing scheme is expected, which can allow the designed hardware to concurrently have the DCT-II and DST-II operational capabilities to thereby reduce the hardware cost.

Equation (54) and Equation (55) are defined as m-point DCT-II and DST-II math models respectively. For input signals $p[n_0]$ and $q[n_0]$ and output signals $P_{DCT-II}[k_0]$ and $Q_{DCT-II}[k_0]$, where $n_0=0\sim c-1$, $k_0=0\sim c-1$, $$P_{DCT-II}[k_0] = \sum_{n_0=0}^{c-1} p[n_0] \times \cos\left(\frac{(2n_0 + 1)k_0\pi}{2c}\right). \tag{54}$$

$$Q_{DST-II}[k_0] = \sum_{n_0=0}^{c-1} q[n_0] \times \sin\left(\frac{(2n_0 + 1)k_0\pi}{2c}\right). \tag{55}$$

For different applications, the c-point number can be odd or even, which is separately discussed as follows.

(A) c is an Odd Number

Figure 10:
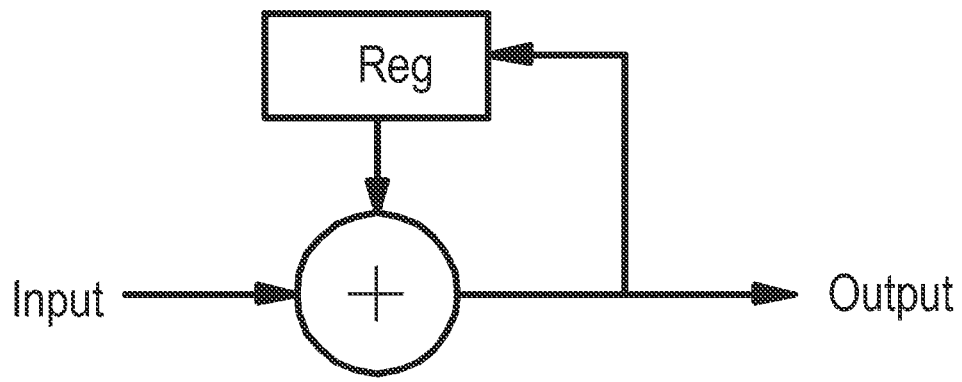
FIG. 10 is a schematic diagram of a hardware architecture corresponding to equation (56) according to an embodiment of the present invention.
Figure 12:
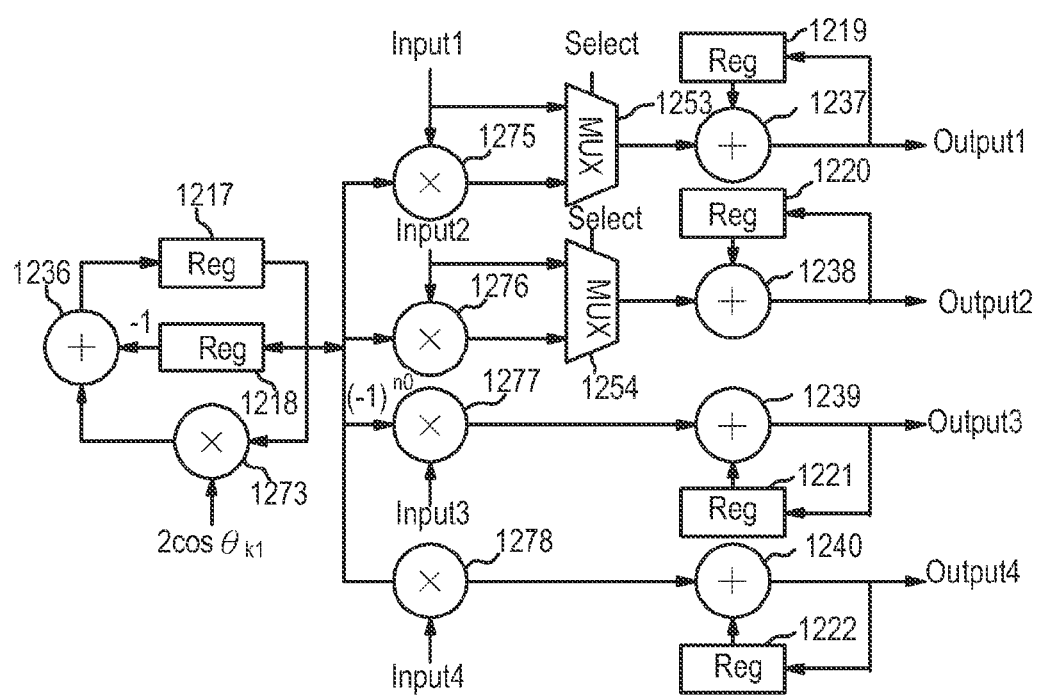
FIG. 12 is a schematic diagram of a DCT-II/DST-II hardware architecture according to an embodiment of the present invention.

If c is an odd number, Equation (54) can be rewritten as Equation (56), Equation (57):

$$P_{DCT-II}[0] = p^{(1)}[0] + p^{(1)}[1] +, \ldots, + p^{(1)}[(c-1)/2 - 1] + p\left[\frac{c-1}{2}\right], \tag{56}$$

$$P_{DCT-II}[k_0] = \sum_{n_0=0}^{(c-1)/2-1} p^{(1)}[n_0] \times \cos\left(\frac{(2n_0+1)k\pi}{2c}\right) + tmp0 \times p\left[\frac{c-1}{2}\right], \tag{57}$$

where $p^{(1)}[n_0] - p[n_0] + (-1)^{k_0}p[c-1-n_0]$, (58)

and $tmp0 = \begin{cases} 1, & \mod(k_0, 4) = 0 \\ -1, & \mod(k_0, 4) = 2 \\ 0, & \mod(k_0, 4) = 1 \text{ or } 3. \end{cases}$ From equation (56), equation (57), it is known that the input data $p[n_0]$ in equation (54) is operated with equation (58) to produce $p^{(1)}[n_0]$, which has a half of data amount than the original, so the computational period required for DCT-II includes (c−1)/2×c cycles only, but the operation in equation (56) requires using additional adders and registers, as shown in FIG. 10 in which is a schematic diagram of the hardware architecture corresponding to equation (56) according to an embodiment of the embodiment. In this case, when the operation in equation (56) is implemented with a common hardware, as shown in FIG. 12 in which is a schematic diagram of the DCT-II/DST-II hardware architecture according to an embodiment of the embodiment, the computational period to be required for DCT-II includes (c+1)/2×c cycles.

Similarly equation (55) can be rewritten as equation (59), equation (60), and equation (61) as follows:

$$Q_{DST-II}[0] = 0, \tag{59}$$

$$Q_{DST-II}[k_0] = \sum_{n_0=0}^{(c-1)/2-1} q^{(1)}[n_0] \times \sin\left(\frac{(2n_0+1)k_0\pi}{2c}\right) + tmp1 \times q\left[\frac{c-1}{2}\right], \tag{60}$$

where $q^{(1)}[n_0] = q[n_0] + (-1)^{k_0+1}q[c-1-n_0]$, (61)

and $tmp1 = \begin{cases} 1, & \mod(k_0, 4) = 1 \\ -1, & \mod(k_0, 4) = 3 \\ 0, & \mod(k_0, 4) = 0 \text{ or } 2. \end{cases}$ From equation (59), equation (60), it is known that the input data $q[n_0]$ in equation (55) is operated with equation (61) to thereby produce $q^{(1)}[n_0]$, which has a half of data amount than the original, so the computational period required for DST-II includes (c−1)/2×c cycles only.

Next, the cosine function is derived from the sine function in the DST-II method, so the cosine coefficients in the DCT-II method can be shared in the hardware implementation as follows.

$$Q_{DST-II}[c-k_0] = \tag{62}$$
$$\sum_{n_0=0}^{(c-1)/2-1} (-1)^{n_0} \times q^{(2)}[n_0] \times \cos\left(\frac{(2n_0+1)k_0\pi}{2c}\right) + tmp1 \times q\left[\frac{c-1}{2}\right],$$

where $q^{(2)}[n_0] = q[n_0] + (-1)^{c-k_0+1}q[c-1-n_0]$. (63)

From equation (62), equation (53), it is known that the cosine coefficients for DCT-II can be shared by simply ordering the output signals and adjusting the positive and negative signs of the input signals for DST-II, to thereby produce the operational result for DST-II and save the hardware cost.

(B) c is an Even Number

If c is an even number, equation (54) can be rewritten as equation (64), equation (65) as follows.

$$P_{DCT-II}[0] = p^{(1)}[0] + p^{(1)}[1] +, \ldots, + p^{(1)}[c/2-1], \tag{64}$$

$$P_{DCT-II}[k_0] = \sum_{n_0=0}^{c/2-1} p^{(1)}[n_0] \times \cos\left(\frac{(2n_0+1)k_0\pi}{2c}\right). \tag{65}$$

Figure 11:
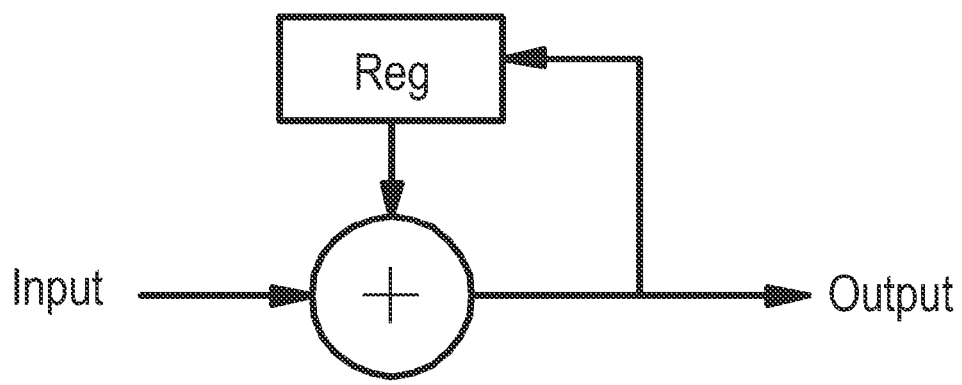
FIG. 11 is a schematic diagram of using additional adder and registers according to an embodiment of the present invention.

From Equation (64), Equation (65), it is known that the input data $p[n_0]$ in Equation (54) is operated with Equation (58) to produce $p^{(1)}[n]$, which has a half of data amount than the original, so the computational period required for DCT-II includes c/2×(c−1) cycles only, but the operation in Equation (56) requires using additional adders and registers, as shown in FIG. 11 in which is a schematic diagram of using additional adder and registers according to an embodiment of the embodiment. In this case, when the operation in Equation (56) is implemented with a common hardware, as shown in FIG. 12, the computational period to be required for DCT-II includes $c^2/2$ cycles.

Similarly, Equation (55) can be rewritten as Equation (66), Equation (67) as follows:

$$Q_{DST-II}[0] = 0. \quad (66)$$

$$Q_{DST-II}[k_0] = \sum_{n_0=0}^{c/2-1} q^{(1)}[n_0] \times \sin\left(\frac{(2n_0+1)k_0\pi}{2c}\right). \quad (67)$$

Next, the cosine function can be derived from the sine function in the DST-II method, so the cosine coefficients in the DCT-II method can be shared in the hardware implementation as follows:

$$Q_{DST-II}[c-k_0] = \sum_{n_0=0}^{c/2-1} (-1)^{n_0} \times q^{(2)}[n_0] \times \cos\left(\frac{(2n_0+1)k_0\pi}{2c}\right). \quad (68)$$

From equation (66), it is known that the cosine coefficients for DCT-II can be shared by simply ordering the output signals and adjusting the positive and negative signs of the input signals for DST-II to thereby produce the operational result for DST-II and save the hardware cost.

Finally, upon the Chebyshev polynomials, the following equations can be obtained:

$$\cos\left(\frac{(2n_0+1)k_0\pi}{2c}\right) = \\ 2 \times \cos\left(\frac{k_0\pi}{c}\right)\cos\left(\frac{(2n_0-1)k_0\pi}{2c}\right) - \cos\left(\frac{(2n_0-3)k_0\pi}{2c}\right). \quad (69)$$

The initial values, $\cos(k_0\pi/c)$, $\cos(k_0\pi/2c)$, $\cos(k_0(-1)\pi/2c)$ respectively for three cosine functions at the right side of the equality in Equation (69) in the invention can be obtained by plugging $n_0=1$. Since $\cos(k_n(-1)\pi/2c) = \cos(k_0\pi 2c)$, the cosine coefficients with a same k1 and different n1 can be generated by the recursive operation in Equation (69), with accessing $\cos(k_0\pi/c)$ and $\cos(k_0\pi/2c)$, and the memory requirement of 2c words only.

Plugging equation (69) in equation (57), equation (62), equation (65), equation (68), the method with the low operation cycle and DCT-III/DST-III operational capabilities is obtained. In this case, the derived method requires a hardware architecture designed as that shown in FIG. 12.

In FIG. 12, $p^{(1)}[n_0]$ indicates the input signals Input1 and Input2, and $q^{(1)}[n_0]$ indicates the input signals Input3 and Input4. When c is an odd number, the output signals Output1 and Output2 correspond to the result operated in equation (57) or equation (56), the output signals Output3 and Output4 correspond to the result operated in equation (62).

When c is an even number, the output signals Output1 and Output2 correspond to the result operated in equation (64) and equation (65), the output signals Output3 and Output4 correspond to the result operated in equation (68). The parameters corresponding to the output signals in FIG. 12 are shown in Table 5.4.1 as follows.

TABLE 5.4.1

DCT-II/DST-II hardware and method relative table

| Hardware I/O | Corresponding Parameters |
| --- | --- |
| Input1 | Data after $T_c(n_0, k_1, k_0)$ operates in equation (39) |
| Input2 | Data after $T_c(n_0, m - k_1 - 1, k_0)$ operates in equation(39) |
| Input3 | Data after $T_s(n_0, k_1, k_0)$ operates in equation (44) |
| Input4 | Data after $T_s(n_0, m - k_1 - 1, k_0)$ operates in equation(44) |
| Output1 | $X_c(k_0, k_1)$ |
| Output2 | $X_c(k_0, m - 1 - k_1)$ |
| Output3 | $X_s(c - k_0, k_1)$ |
| Output4 | $X_s(c - k_0, m - 1 - k_1)$ |

P.S.; $k_0 = 0 \sim c - 1$, $k_1 = 0 \sim (m+1)/2$ when m is an odd number, $k_1 = 0 \sim m/2$ when m is an even number.

As cited above and shown in FIG. 12, it is known that the recursive type-II discrete cosine/sine transform device 140 can be implemented in a common hardware, and the computational period includes $c \times (c+1)/2$ cycles, the recursive type-II discrete cosine/sine transform device 140 includes seventh to twelfth registers 1217-1222, sixth to tenth adders 1236-1240, a third 3-to-1 multiplexer 1253, a fourth 3-to-1 multiplexer 1254, a third multiplier 1273, a fifth multiplier 1275, a sixth multiplier 1276, a seventh multiplier 1277, and an eighth multiplier 1278.

As cited above, an M-point DCT-V operation in the invention is divided into an m-point DCT-III/DST-III operation and a c-point DCT-II/DST-II operation. Namely, the input signals pass through the first stage of DCT-III/DST-III and sequentially the second stage of DCT-II/DST-II. However, the operation in the immediate stage of cosine and sine factors is required before the signals input to the second stage. The hardware architectures respectively for the first and the second stages are aforementioned, and the operation in the immediate stage of cosine and sine factors and corresponding hardware design are described in detail as follows.

Figure 13:
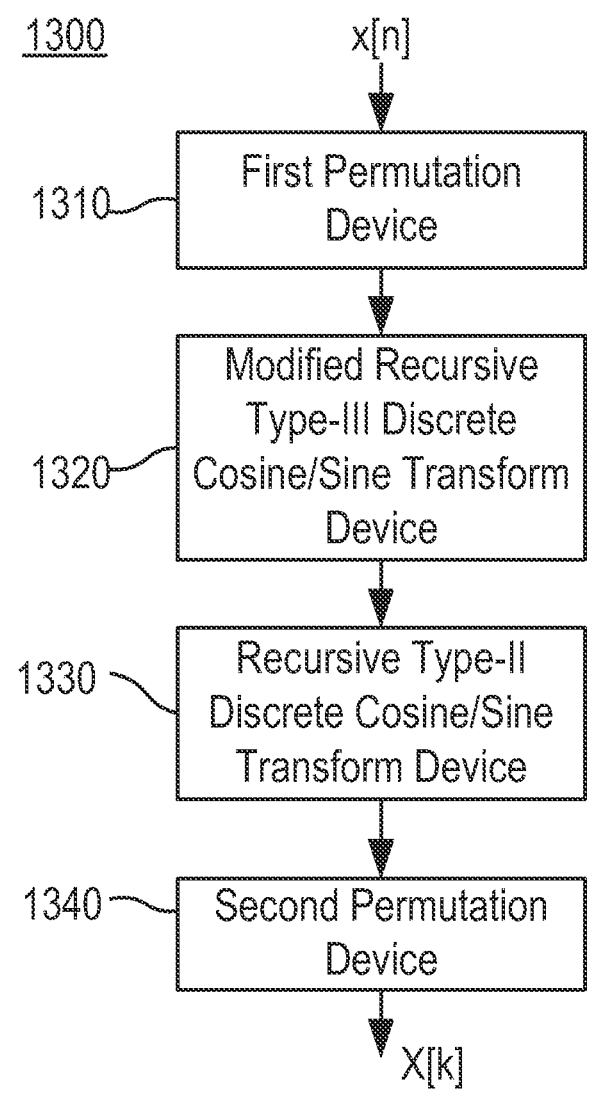
FIG. 13 is a schematic diagram of a recursive type-IV discrete cosine transform system according to another embodiment of the present invention.

FIG. 13 is a schematic diagram of the recursive type-IV discrete cosine transform system 1300 according to another embodiment of the embodiment. In FIG. 13, the system 1300 includes a first permutation device 1310, a modified recursive type-III discrete cosine/sine transform device 1320, a recursive type-II discrete cosine/sine transform device 1330, and a second permutation device 1340. The system 130 merges the immediate cosine and sine factor operations to the modified recursive type-III discrete cosine/sine transform device 1320.

The first permutation device 1310 receives N digital input signals and performs a two-dimensional order permutation operation on the N digital signals for generating N two-dimensional first temporal signals, where N is a positive integer.

The modified recursive type-III discrete cosine/sine transform device 1320 is connected to the first permutation device 1310 and has a first and a second operational modes such that in the first operational mode a type-II discrete cosine/sine transform is repeated c times on the N first temporal signals for generating c second temporal signals each with m points, where N=m×c, and m, c are a positive integer.

The recursive type-II discrete cosine/sine transform device 1330 is connected to the modified recursive type-III discrete cosine/sine transform device 1320 and has a first and a second operational modes such that in the first operational mode a third temporal signal is received and a type-II discrete cosine/sine transform is repeated m times on the third temporal signal for generating m fourth temporal signals each with c points.

The second permutation device 1340 is connected to the recursive type-II discrete cosine/sine transform device 1330 in order to receive the fourth temporal signals and perform a one-dimensional order permutation operation on the fourth temporal signals for generating N one-dimensional output signals, wherein the N one-dimensional output signals are obtained by performing a type-IV discrete cosine transform on the N digital input signals.

From equation (32) and equation (34), it is known that the result of the first stage of DCT-II and DST-III operations is multiplied by the cosine and sine factors defined as follows:

Cosine Factor:

$$\cos\left(\frac{(2n_0 + 1)(2k_1 + 1)\pi}{4M}\right). \quad (70)$$

Sine Factor:

$$\sin\left(\frac{(2n_0 + 1)(2k_1 + 1)\pi}{4M}\right). \quad (71)$$

From equation (70) and equation (71), it is seen that, with $n_0=0\sim c-1$, $k_1=0\sim m-1$, and $M=m\times c$, the M-point DCT-IV requires M cosine factors and M sine factors, i.e., the memory capacity of 2M words is required for accessing the cosine and sine factors. To reduce a size of memory, the cosine and sine factor generation device, i.e., a cosine and sine coefficient generator, is designed in the invention.

First, since the first stage of hardware architecture generates two DCT-II and two DST-III operational results every in cycles, as shown in Table 5.3.1. Thus, the results (data) are multiplied by the corresponding cosine and sine factors defined in equation (72), such that the immediate stage of operations is complete as the four factors are concurrently generated.

$$\begin{cases} \cos\left(\frac{(2n_0 + 1)(2k_1 + 1)\pi}{4M}\right) \\ \sin\left(\frac{(2n_0 + 1)(2k_1 + 1)\pi}{4M}\right) \\ \cos\left(\frac{(2n_0 + 1)(2(m - k_1 - 1) + 1)\pi}{4M}\right) \\ \sin\left(\frac{(2n_0 + 1)(2(m - k_1 - 1) + 1)\pi}{4M}\right) \end{cases} \quad (72)$$

for $n_0 = 0 \sim c - 1$ if $m$ is even, for $k_1 = 0 \sim m/2$ if $m$ is odd, for $k_1 = 0 \sim (m + 1)/2$.

It is known in FIG. 2 that the output order of the first stage of output data first sets the index $k_1=0$ and changes the index $n_0$ from zero to c−1, then sets $k_1=1$ and changes $n_0$ from zero to c−1, and finally repeats to set $k_1$ to a fixed value and change $n_0$ from zero to c−1 until $k_1=m-1$, which indicates the first stage of output data is completely output. Upon such an architecture, DTPT=2, and the data corresponding to the indexes $k_1$ and $m-1-k_1$ can be concurrently generated, so the cosine and sine factor generation device in the invention can output the coefficients meeting with the output order of the first stage of output data.

For a more clear derivation, some parameters in the invention are defined as:

$$\theta_f = \frac{(2k_1 + 1)\pi}{4M}, \theta_b = \frac{(2(m - k_1 - 1) + 1)\pi}{4M}.$$

Upon the trigonometric functions' sum identities:

$$\begin{cases} \cos(\alpha + \beta) = \cos\alpha \times \cos\beta - \sin\alpha \times \sin\beta \\ \sin(\alpha + \beta) = \sin\alpha \times \cos\beta + \cos\alpha \times \sin\beta, \end{cases}$$

equation (72) can be derived to the recursion as follows:

$$\begin{cases} \cos((2n_0 + 1)\theta_f) = \cos((2n_0 - 1)\theta_f) \times \cos(2\theta_f) - \sin((2n_0 - 1)\theta_f) \times \sin(2\theta_f) \\ \sin((2n_0 + 1)\theta_f) = \sin((2n_0 - 1)\theta_f) \times \cos(2\theta_f) + \cos((2n_0 - 1)\theta_f) \times \sin(2\theta_f) \\ \cos((2n_0 + 1)\theta_b) = \cos((2n_0 - 1)\theta_b) \times \cos(2\theta_b) - \sin((2n_0 - 1)\theta_b) \times \sin(2\theta_b) \\ \sin((2n_0 + 1)\theta_b) = \sin((2n_0 - 1)\theta_b) \times \cos(2\theta_b) + \cos((2n_0 - 1)\theta_b) \times \sin(2\theta_b). \end{cases} \quad (73)$$

From the recursion above, it is easy to discover that the initial values $\cos(\theta_f)$, $\sin(\theta_f)$, $\cos(\theta_b)$, $\sin(\theta_b)$ and $\cos(2\theta_f)$, $\sin(2\theta_f)$, $\cos(2\theta_b)$, $\sin(2\theta_b)$ are required for completing the operation. The number of initial values can influence the ROM size, i.e., the more the number of initial values is, the more the number of words required for ROM. For reducing the number of initial values, the recursion is derived as follows:

$$\begin{cases} \cos(2\theta_f) = \cos(\theta_f) \times \cos(\theta_f) - \sin(\theta_f) \times \sin(\theta_f) \\ \sin(2\theta_f) = \sin(\theta_f) \times \cos(\theta_f) + \cos(\theta_f) \times \sin(\theta_f) \\ \cos(2\theta_b) = \cos(\theta_b) \times \cos(\theta_b) - \sin(\theta_b) \times \sin(\theta_b) \\ \sin(2\theta_b) = \sin(\theta_b) \times \cos(\theta_b) + \cos(\theta_b) \times \sin(\theta_b). \end{cases} \quad (74)$$

where only the initial values $\cos(\theta_f)$, $\sin(\theta_f)$, $\cos(\theta_b)$, $\sin(\theta_b)$ are used to generate a same $k_1$ and different $n_o$ for the cosine and sine factors since $\cos(2\theta_f)$, $\sin(2\theta_f)$, $\cos(2\theta_b)$, $\sin(2\theta_b)$ can be calculated in equation (74). Therefore, the recursive relations are:

$$n_0 = 0: \begin{cases} \cos(\theta_f) \\ \sin(\theta_f) \\ \cos(\theta_b) \\ \sin(\theta_b) \end{cases},$$

-continued $$n_0 = 1: \begin{cases} \cos(3\theta_f) = \cos(\theta_f) \times \cos(2\theta_f) - \sin(\theta_f) \times \sin(2\theta_f) \\ \sin(3\theta_f) = \sin(\theta_f) \times \cos(2\theta_f) + \cos(\theta_f) \times \sin(2\theta_f) \\ \cos(3\theta_b) = \cos(\theta_b) \times \cos(2\theta_b) - \sin(\theta_b) \times \sin(2\theta_b) \\ \sin(3\theta_b) = \sin(\theta_b) \times \cos(2\theta_b) + \cos(\theta_b) \times \sin(2\theta_b) \end{cases},$$

$$n_0 = 2: \begin{cases} \cos(5\theta_f) = \cos(3\theta_f) \times \cos(2\theta_f) - \sin(3\theta_f) \times \sin(2\theta_f) \\ \sin(5\theta_f) = \sin(3\theta_f) \times \cos(2\theta_f) + \cos(3\theta_f) \times \sin(2\theta_f) \\ \cos(5\theta_b) = \cos(3\theta_b) \times \cos(2\theta_b) - \sin(3\theta_b) \times \sin(2\theta_b) \\ \sin(5\theta_b) = \sin(3\theta_b) \times \cos(2\theta_b) + \cos(3\theta_b) \times \sin(2\theta_b) \end{cases},$$

$$\vdots$$

$$n_0 = c - 1:$$

$$\begin{cases} \cos((2c-1)\theta_f) = \cos((2c-3)\theta_f) \times \cos(2\theta_f) - \sin((2c-3)\theta_f) \times \sin(2\theta_f) \\ \sin((2c-1)\theta_f) = \sin((2c-3)\theta_f) \times \cos(2\theta_f) + \cos((2c-3)\theta_f) \times \sin(2\theta_f) \\ \cos((2c-1)\theta_b) = \cos((2c-3)\theta_b) \times \cos(2\theta_b) - \sin((2c-3)\theta_b) \times \sin(2\theta_b) \\ \sin((2c-1)\theta_b) = \sin((2c-3)\theta_b) \times \cos(2\theta_b) + \cos((2c-3)\theta_b) \times \sin(2\theta_b) \end{cases}.$$

Figure 14:
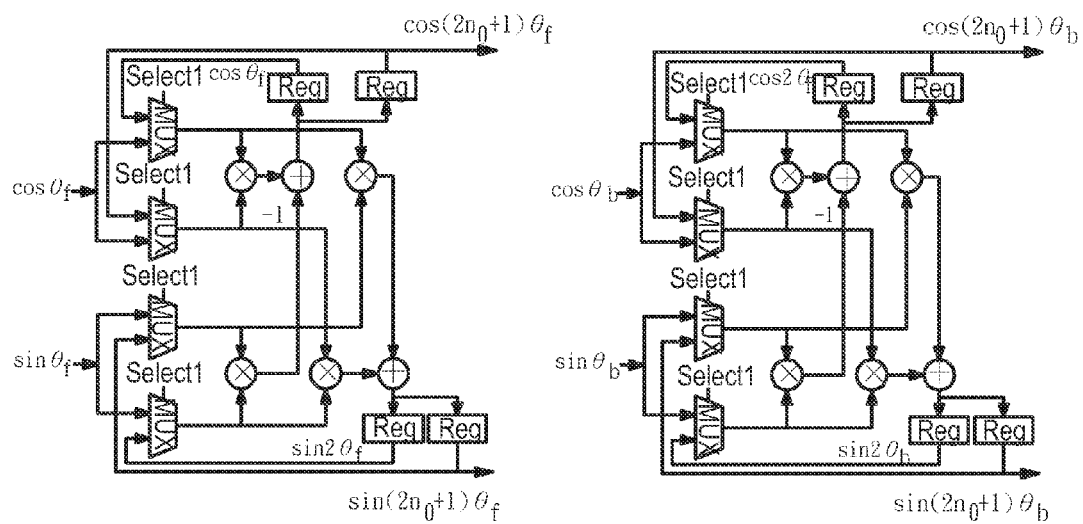
FIG. 14 is a schematic diagram of a cosine/sine factor generation device according the present invention.

The hardware architecture can be implemented with reference to FIG. 14 in which is a schematic diagram of a cosine/sine factor generation device according to the embodiment.

TABLE 5.5.1

Hardware estimation of cosine and sine factor generation device

| Multiplier | Adder | Rom |
|---|---|---|
| 8 | 4 | 2m |

Table 5.5.1 indicates the hardware estimation of cosine and sine factor generation device. It is known from Table 5.5.1 that the ROM size can be reduced from 2M to 2m, i.e., 1/c than the original, which is relatively improved in memory requirement, but the price is eight additional multipliers and four additional adders. To overcome this, the inventive architecture is further improved.

Cosine and sine factors' multiplication operation and data folding process:

Upon equation (32) and equation (34), the results of a DCT-III and DST-III operation are multiplied by the cosine and sine factors, and the results after the multiplication take an addition or subtraction operation to one another. Next, it is known from equation (58) and equation (63) that the data is folded to reduce the data amount to a half and input to the second stage of DST-II/DST-II operations. The cited above is the immediate stage of operations and generally divided into three steps as follows:

1. The input signals are multiplied by the cosine and sine factors respectively.
2. The signals multiplied by the cosine factor and by the sine factor are added or subtracted to one another.
3. The results after the operation in step (2) are folded.

Figure 15:
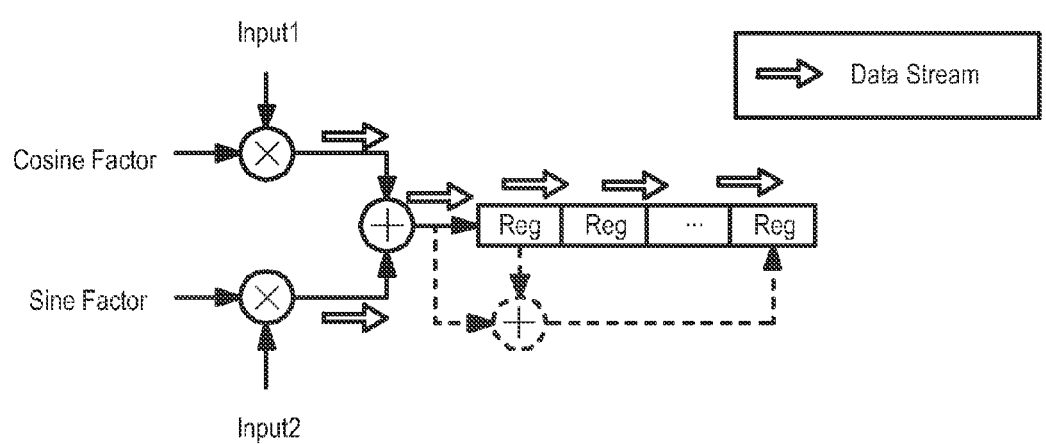
FIG. 15 is a schematic diagram of a hardware action of inputting upper half data in a folding operation according to the present invention.
Figure 16:
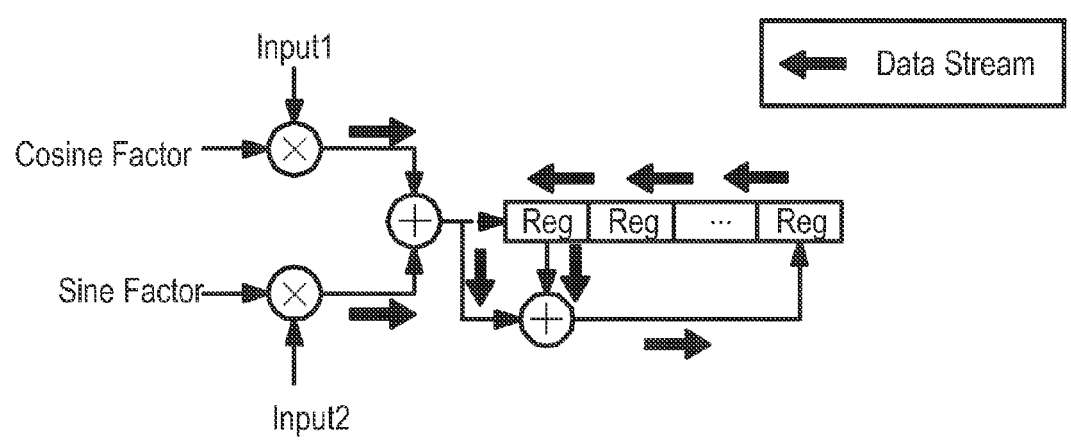
FIG. 16 is a schematic diagram of a hardware action of inputting lower half data in a folding operation according to the present invention.

The data after completing the immediate stage is stored in the registers. Since the folding operation reduces the data amount to a half, only [c/2] records of data are required in access. In addition, the immediate stage of operations can update the data of the registers, and the second stage of operations needs to repeatedly provide the immediate values c time to the registers, so that the data of the registers cannot be updated continuously. In this case, the number of registers is additionally doubled. Accordingly, c registers are required for the results of a folding operation. As to the hardware action of the folding operation, an example of c as even numbers is described as follows: generating c−1 data in step 2 and sequentially storing the 0-th to (c/2−1)-th records of data directly in the registers, as shown in FIG. 15 in which is a schematic diagram of the hardware action of inputting the upper half data in the folding operation according to the embodiment. The (c/2)-th to (c−1)-th records of data are operated with the data in the registers, and the results are stored back to the registers, as shown in FIG. 16 in which is a schematic diagram of a hardware action of inputting lower half data in the folding operation according to the embodiment.

Next, plugging equation (12) and equation (14) in equation (58) and equation (63), the relation can be obtained as follows.

$$T_c'(n_0,k_1,0)=T_c(n_0,k_1,0)+T_c(c-n_0-1,k_1,0),$$

$$T_c'(n_0,m-k_1-1,0)=T_c(n_0,m-k_1-1,0)+T_c(c-n_0-1,m-k_1-1,0),$$

$$T_c'(n_0,k_1,1)=T_c(n_0,k_1,1)+T_c(c-n_0-1,k_1,1),$$

$$T_c'(n_0,m-k_1-1,1)=T_c(n_0,m-k_1-1,1)+T_c(c-n_0-1,m-k_1-1,1),$$

$$T_s'(n_0,k_1,0)=T_s(n_0,k_1,0)+T_s(c-n_0-1,k_1,0),$$

$$T_s'(n_0,m-k_1-1,0)=T_s(n_0,m-k_1-1,0)+T_s(c-n_0-1,m-k_1-1,0),$$

$$T_s'(n_0,k_1,1)=T_s(n_0,k_1,1)+T_s(c-n_0-1,k_1,1),$$

$$T_s'(n_0,m-k_1-1,1)=T_s(n_0,m-k_1-1,1)+T_s(c-n_0-1,m-k_1-1,1), \quad (75)$$

where
if c is even, for $n_0=0\sim c/2-1$
if c is odd, for $n_0=0\sim(c-1)/2-1$
if m is even, for $k_1=0\sim m/2\ 1$
if m is odd, for $k_1=0\sim(m-1)/2-1$.

Figure 17A:
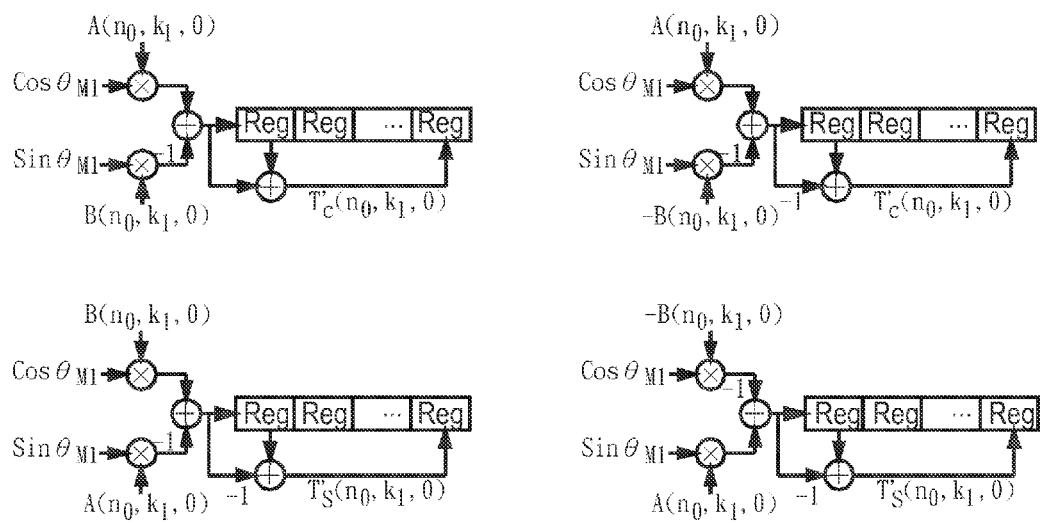
FIGS. 17(A) and 17(B) are schematic diagrams of a complete intermediate-stage operation architecture according to the present invention.
Figure 17B:
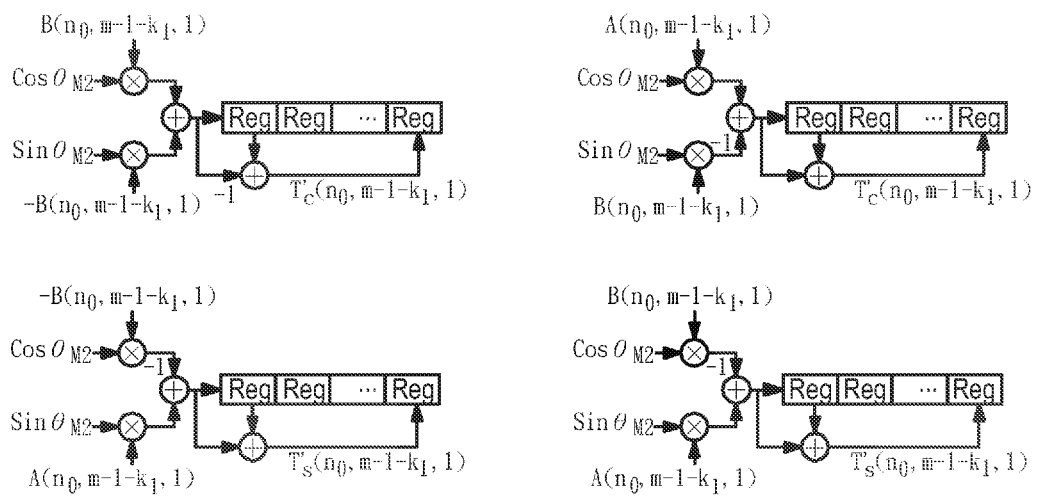

With reference to the relation above, 8c registers are totally required, and the corresponding hardware architectures are shown in FIG. 17(A) and FIG. 17(B). FIGS. 17(A) and 17(B) are schematic diagrams of a complete intermediate-stage operation architecture according to the embodiment, where $$\theta_{M1} = \frac{(2n_0+1)(2k_1+1)\pi}{4M}, \theta_{M2} = \frac{(2n_0+1)(2(m-k_1-1)+1)\pi}{4M}.$$

TABLE 5.5.2

Cosine and sine factors' multiplication operation and data folding process

| Multiplier | Adder | Register |
|---|---|---|
| 16 | 16 | 8c |

Table 5.5.2 indicates the cosine and sine factors' multiplication operation and data folding process. It is known from Table 5.5.3 that the hardware cost for the immediate stage of operations is relatively high. To overcome this, the architecture is further improved.

As cited, it is discovered that the hardware cost for the immediate stage of operations is relatively high, which requires 24 multipliers and 20 adders in total. It is also easy to see in Table 5.5.3 that the multipliers of the immediate stage occupy 75% of the entire architecture while the adders occupy 67%, such that a total of 32 multipliers and 30 adders are required for the entire architecture, which is not expected in the invention because, though the operational speed or bit rate of the recursive architecture is relatively increased, the price is the huge hardware resources. Thus, reducing the hardware is further required for reducing the negative effect of the method.

TABLE 5.5.3

Hardware resource analysis

|  | Multiplier | Adder |
|---|---|---|
| First-stage DCT-III/DST-III | 3 | 5 |
| Second-stage DCT-II/DST-II | 5 | 5 |
| Immediate-stage operations | 24 | 20 |
| Entire architecture | 32 | 30 |

First, the feature of the immediate-stage operations is first observed, where the input data is the results obtained from the first-stage operations, i.e., the immediate stage is operated only when the first stage generates the output data. As cited above, the first stage generates the output data every m cycles, such that the immediate stage is operated every m cycles. Upon the feature, the proposed solution uses the first and second stages of hardware to support the immediate-stage operations, and in this case the first and second stages of circuits are halted to increase more operational time. Namely, after the first stage generates the output data every m cycles, the first and second stages of circuits are halted. The hardware action on halting is described as follows:

1. The first halt cycle uses 3 multipliers, one adder in the first stage, and five multipliers, three adders in the second stage to thereby complete the operations of the aforementioned cosine and sine factor generation device.

2. The second halt cycle uses four multipliers, five adders in the first stage, and four multipliers, three adders in the second stage to thereby complete the operations of $T_c'(n_0,k_1,0)$, $T_c'(n_0,k_1,1)$, $T_s'(n_0,k_1,0)$ $T_s'(n_0,k_1,1)$ in FIGS. 17(A) and 17(B).

3. The third halt cycle uses four multipliers, five adders in the first stage and four multipliers, three adders in the second stage to thereby complete the operations of $T_c'(n_0,m-k_1-1,0)$, $T_c'(n_0,m-k_1-1,1)$, $T_s'(n_0,m-k_1-1,0)$, $T_s'(n_0,m-k_1-1,1)$ in FIGS. 17(A) and 17(B).

Figure 18:
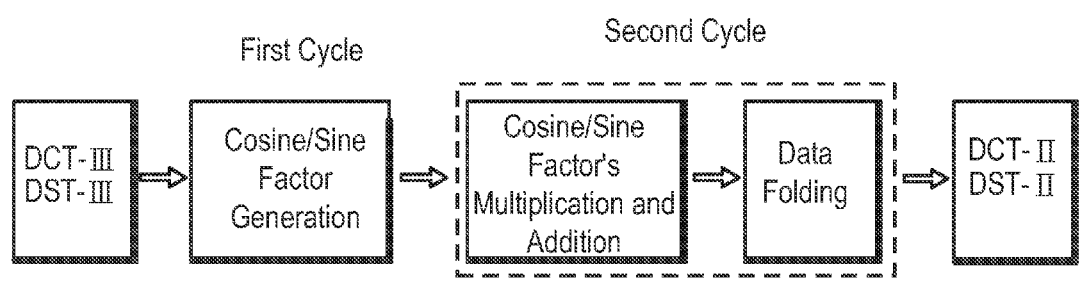
FIG. 18 is a schematic diagram of operations corresponding to halt cycles according to the present invention.

FIG. 18 is a schematic diagram of the operations corresponding to the halt cycles according to the embodiment. As shown in FIG. 18, with three halt cycles, the hardware architecture in the first and the second stages can be shared to thereby replace the 24 multipliers and 20 adders required for the immediate stage.

Figure 19:
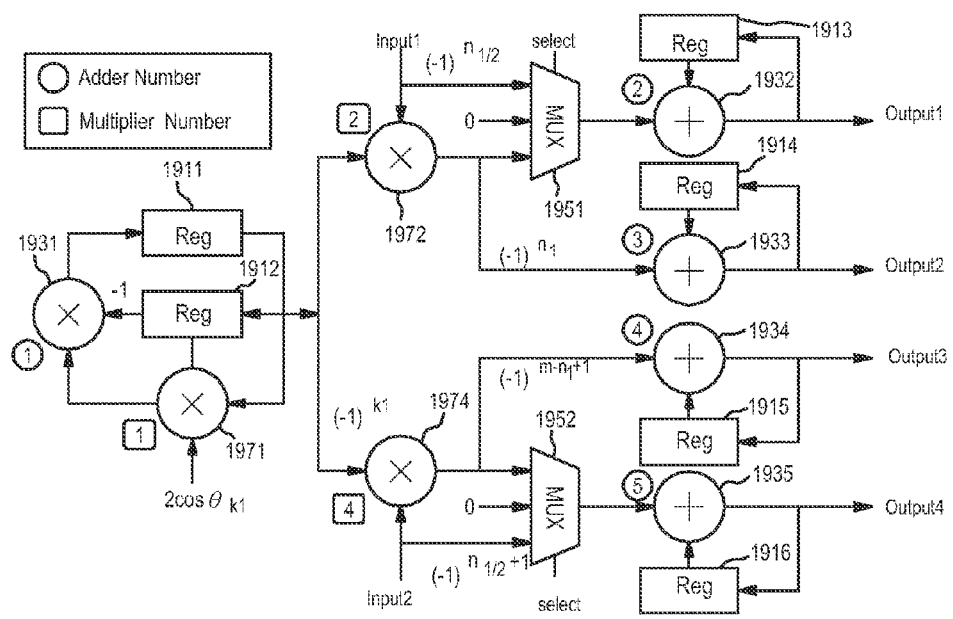
FIG. 19 is a schematic diagram of a modified recursive type-III discrete cosine/sine transform device according to the present invention.
Figure 20:
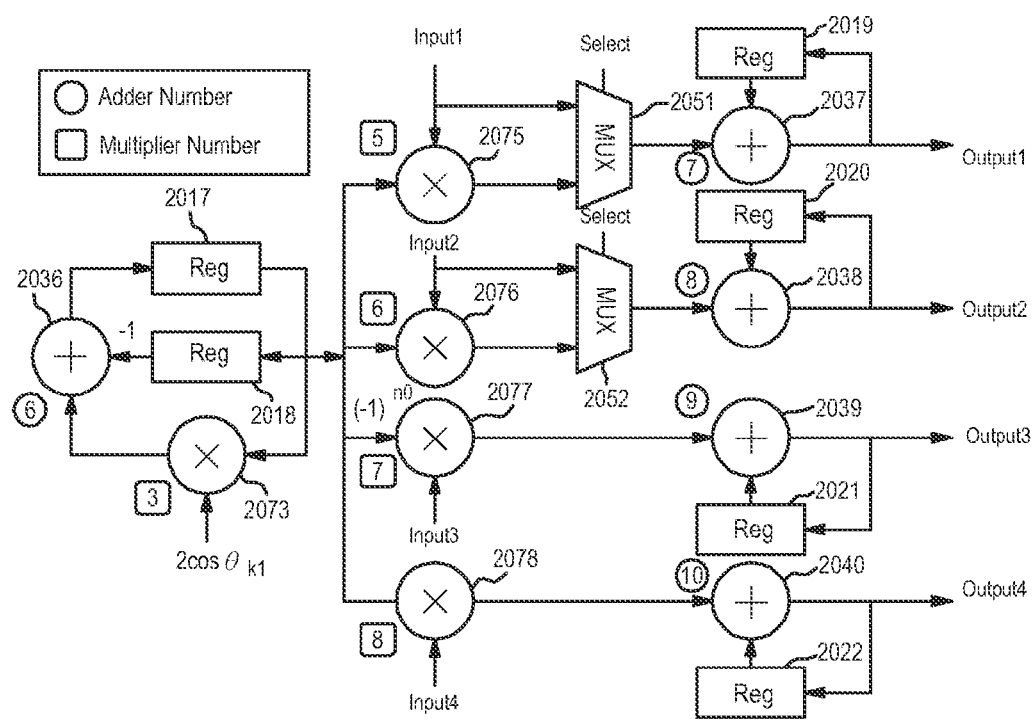
FIG. 20 is a schematic diagram of a recursive type-II discrete cosine/sine transform device according to the present invention.

FIG. 19 is a schematic diagram of the modified recursive type-III discrete cosine/sine transform device according to the embodiment. FIG. 20 is a schematic diagram of the recursive type-II discrete cosine/sine transform device according to the embodiment. With reference to FIGS. 19 and 20, each halt cycle uses the multipliers and adders in the first and the second stages, and the corresponding hardware is shown in Table 5.5.4.

TABLE 5.5.4

Corresponding hardware of each halt cycle

| Halt Cycle | Multiplier Number | Adder Number |
|---|---|---|
| 1 | 1.2.3.4.5.6.7.8 | 1.6.7.9 |
| 2 | 1.2.3.4.5.6.7.8 | 1.2.3.4.5.6.7.9 |
| 3 | 1.2.3.4.5.6.7.8 | 1.2.3.4.5.6.7.9 |

The concept of the common hardware is to provide different input signals in hardware at different time points, and thus additional multiplexers are used to control the select lines of the added multiplexers to thereby select the different input data. Therefore, the purpose of sharing the hardware is achieved. It is known in Table 5.5.5 that a number of transistors of a multiplexer (MUX) are far fewer than that of an adder and of a multiplier, so the effectiveness is very high while the multiplexers are used to reduce a number of used multipliers and adders,

TABLE 5.5.5

Transistor number of 24-bit component

| Component | Latch | Adder | Multiplier | Multiplexer |
|---|---|---|---|---|
| Transistors | 240 | 672 | 18624 | 192 |

In addition, the more the hardware is shared, the more the number of added multiplexers, but different hardware may have a same input signal corresponding to a same multiplexer, i.e., the different hardware may come from the same multiplexer. Such a multiplexer with the cited feature is shown in FIG. 20. For example, the multipliers with Number 1 and Number 5 commonly use the multiplexer which selects cos $(\theta_f)$ or $\cos(2\theta_f)$ as an output. Thus, the input signal of the multipliers with Number 1 and Number 5 only requires sharing the multiplexer with com_mux1 shown in FIG. 21.

As shown in FIG. 19, when the recursive type-III discrete cosine/sine transform device 1320 and the recursive type-II discrete cosine/sine transform device 1330 are in the second operational mode, the devices 1320 and 1330 sequentially perform cosine/sine factor multiplication and corresponding addition operations on the c in-point second temporal signals for generating the c third temporal signals each with m points sequentially.

As shown in FIG. 19, the recursive type-III discrete cosine/sine transform device 1320 includes first to sixth registers 1911-1916, first to fifth adders 1931-1935, a 3-to-1 multiplexer 1951, a second 3-to-1 multiplexer 1952, a first multiplier 1971, a second multiplier 1972, and a fourth multiplier 1974.

As shown in FIG. 20, the recursive type-II discrete cosine/sine transform device 1330 includes seventh to twelfth registers 2017-2020, sixth to tenth adders 2036-2040, a third 3-to-1 multiplexer 2051, a fourth 3-to-1 multiplexer 2052, a third multiplier 2073, a fifth multiplier 2075, a sixth multiplier 2076, a seventh multiplier 2077, and an eighth multiplier 2078.

Figure 21:
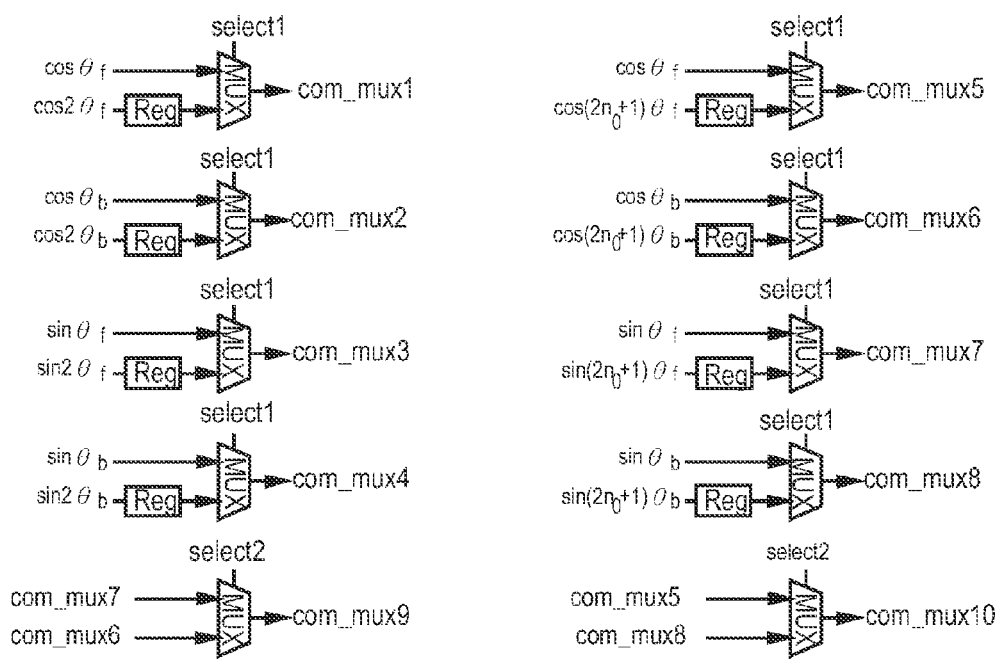
FIG. 21 is a schematic diagram of using common multiplexers according to the present invention.
Figure 22A:
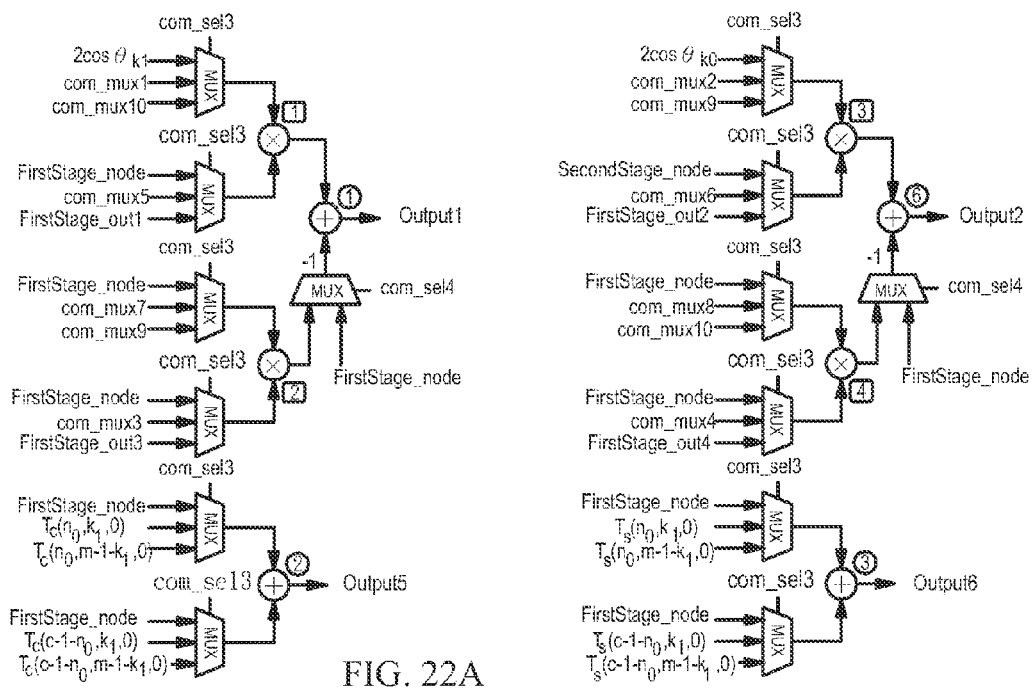
FIGS. 22(A) and 22(B) are schematic diagrams of using common multipliers and adders according to an embodiment of the present invention.
Figure 22B:
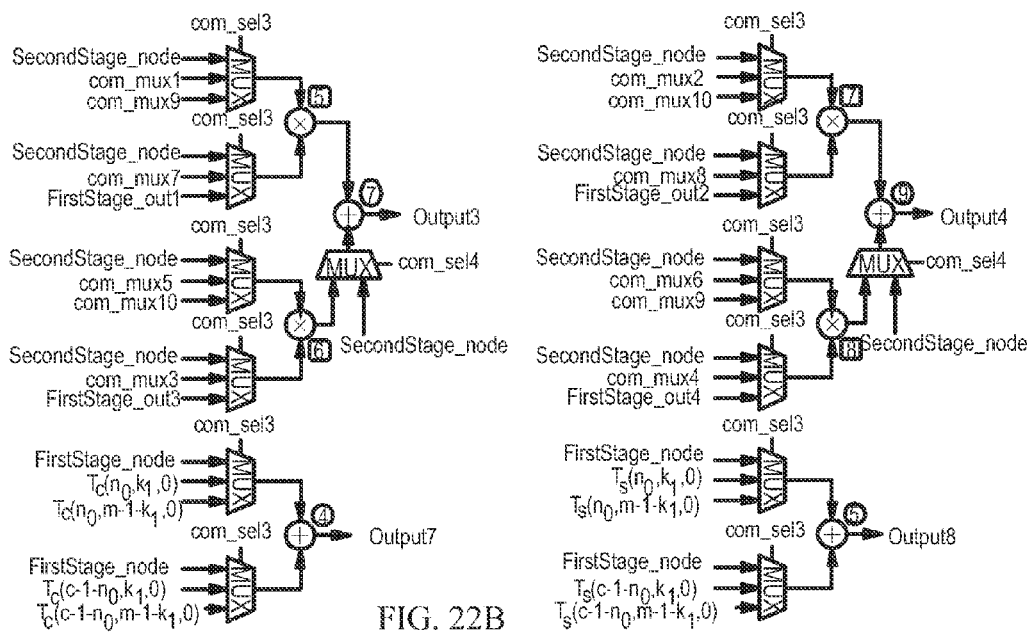

FIG. 21 is a schematic diagram of using common multiplexers according to the embodiment. In FIG. 21, the output signal of a common or shared multiplexer is output to a multiplexer in front of the multipliers. FIGS. 22(A) and 22(B) are schematic diagrams of using common multipliers and adders according to an embodiment of the embodiment. As shown in FIGS. 22(A) and 22(B), multiplier numbering and adder numbering are shown in FIGS. 19 and 20, where a same number indicates the same multiplier or adder. In addition, FirstStage_node in FIGS. 22(A) and 22(B) indicates the original input signals of the multipliers or adders in the first stage of circuit at the DCT-III/DST-III operations, SecondStage_node indicates the original input signals of the multipliers or adders in the second stage of circuit at the DCT-II/DST-II operations, and FirstStage_out1, FirstStage_out2, FirstStage_out3, FirstStage_out4 indicate the DCT-III/DST-III output signals after the first-stage operation, as shown in Table 5.3.1.

As shown in FIGS. 22(A) and 22(B), in a non-halt cycle, every circuit outputs the original signals of the DCT-III/DST-III in the first stage or DCT-II/DST-II in the second stage. In a halt cycle, all hardware supports the immediate stage of operations, and the output signals of each circuit are shown in Table 5.5.6. The common hardware scheme proposed in the invention can effectively reduce the hardware requirement, and a comparison is shown in Table 5.5.7 in which the number of multipliers and the number of adders are used with and without the common hardware design.

TABLE 5.5.6

Outputs of common hardware in different halt cycles

|  | First Halt Cycle | Second Halt Cycle | Third Halt Cycle |
|---|---|---|---|
| Output1 | $\text{Cos}2\theta_f$ $\text{Cos}(2n_0+1)\theta_f$ | $T_c(n_0, k_1, 0)$ | $T_s(n_0, m-1-k_1, 1)$ |
| Output2 | $\text{Cos}2\theta_b$ $\text{Cos}(2n_0+1)\theta_b$ | $T_s(n_0, k_1, 1)$ | $T_c(n_0, m-1-k_1, 0)$ |
| Output3 | $\text{Sin}2\theta_f$ $\text{Sin}(2n_0+1)\theta_f$ | $T_s(n_0, k_1, 0)$ | $T_c(n_0, m-1-k_1, 1)$ |
| Output4 | $\text{Sin}2\theta_b$ $\text{Sin}(2n_0+1)\theta_b$ | $T_s(n_0, k_1, 1)$ | $T_s(n_0, m-1-k_1, 0)$ |
| Output5 | FirstStage_node | $T_c'(n_0, k_1, 0)$ | $T_c'(n_0, m-1-k_1, 0)$ |
| Output6 | FirstStage_node | $T_s'(n_0, k_1, 1)$ | $T_s'(n_0, m-1-k_1, 1)$ |
| Output7 | FirstStage_node | $T_c'(n_0, k_1, 1)$ | $T_c'(n_0, m-1-k_1, 1)$ |
| Output8 | FirstStage_node | $T_s'(n_0, k_1, 0)$ | $T_s'(n_0, m-1-k_1, 0)$ |

TABLE 5.5.7

Multiplier and adder number

|  | Multiplier | Adder |
|---|---|---|
| Non-Common Hardware Design | 32 | 30 |
| Common Hardware Design | 8 | 10 |

Hardware Action and Cycle Number Estimation:

For implementing the proposed method in the invention, it is known as cited that the input data is pre-processed and sequentially input to the first stage of hardware architecture to operate. The first-stage hardware performs m-point DCT-III/DST-III operations and, upon the improved method and architecture, every m cycles can generate two records of data in transformation. The data generated in every m cycles passes through c cycles in the first stage to produce two sets of c-point data, and accordingly M-point outputs are generated for completing all data operations in the first-stage architecture. In this case, referring again to FIG. 2, the number of cycles is shown as follows.

$$m \times c \times [m/2]. \quad (76)$$

As cited, it is known that the c-point DCT-II/DST-II operations are performed by the second-stage hardware and, upon the improved method and architecture, every [c/2] cycles can generate two records of data in transformation. Accordingly, M-point outputs are generated for completing all data operations in the second-stage architecture. In this case, referring again to FIG. 2, the number of cycles is shown as follows.

$$[c/2] \times c \times [m/2]. \quad (77)$$

The invention uses a pipelined architecture to implement the required hardware in which the first stage generates the c-point data. The c-point data is operated with the immediate-stage cosine/sine factors to thereby introduce the data into the second stage. By pipelining, the first stage and the second stage of circuits can be concurrently operated as shown in FIG. 6, and the operational periods of the entire architecture are shown in Table 5.6.1 as follows.

TABLE 5.6.1

Cycles of M-point DCT-IV operation (no common hardware)

| | m | |
|---|---|---|
| c | Even | Odd |
| Even | $m \times c \times \dfrac{m}{2} + \dfrac{c}{2} \times c$ | $m \times c \times \dfrac{m+1}{2} + \dfrac{c}{2} \times c$ |
| Odd | $m \times c \times \dfrac{m}{2} + \dfrac{c+1}{2} \times c$ | $m \times c \times \dfrac{m+1}{2} + \dfrac{c+1}{2} \times c$ |

In the invention, the cosine and sine factor accesses require an overlarge memory, so that the circuits used for the factor generation device relatively reduce the ROM size and additionally increase the multipliers and adders. In addition, since the immediate-stage operations also require a lot of hardware, the first stage and the second stage are re-designed to share the hardware to thereby reduce the number of adders and multipliers, as shown in Table 5.5.6. However, the operational period is slightly increased due to the common hardware, as shown in Table 5.6.2.

TABLE 5.6.2

M-point DCT-IV operational period (with commonhardware)

| | m | |
|---|---|---|
| c | Even | Odd |
| Even | $(m+3) \times c \times \dfrac{m}{2} + \dfrac{c}{2} \times c$ | $(m+3) \times c \times \dfrac{m+1}{2} + \dfrac{c}{2} \times c$ |
| Odd | $(m+3) \times c \times \dfrac{m}{2} + \dfrac{c+1}{2} \times c$ | $(m+3) \times c \times \dfrac{m+1}{2} + \dfrac{c+1}{2} \times c$ |

From Table 5.6.2, it is seen that the whole operational period is dependent of m and c values. There are many types for dividing an M-point DCT-IV into m-point and c-point combinations, but the main point worth discussing is which type of m-point and c-point combination can make the entire hardware to have the highest performance and the smallest operational period.

First, the processing speed of the first stage in the pipelined hardware architecture cannot be greater than that of the second stage, otherwise the following stages cannot process the data output by the previous stage in real-time so as not to operate the entire architecture smoothly. For optimally operating the pipelined architecture, the first stage and the second stage needs to have a same operational period, and the number of points to be divided, i.e., m and c, can influence the operational period of the first stage and of the second stage. Next, it is known from Equation (76) and Equation (77) that the second-stage operational period is half the first-stage operational period. For an example of m, c as an even, when the first stage and second stage have a same operational period, the equality is derived from Equation (76) and Equation (77) as follows.

$$m = \frac{c}{2}. \tag{78}$$

Equation (78) indicates that such an architecture has the highest performance when the number of points in the second stage is double that in the first stage. Thus, the number of points in this architecture is distributed to the second stage greater than the first stage as far as possible, but in cannot be small than c/2 to avoid that the second-stage operational period is greater than the first-stage operational period.

The proposed method and architecture is described. For an example of m, c as an even, as compared with N2/2 cycles required for the typical recursive architecture, it is known in Table 5.6.2 that the number of cycles required for the inventive design is:

$$(m+3) \times c \times \frac{m}{2} + \frac{c}{2} \times c = (m+3) \times \frac{N}{4} + \frac{c^2}{2}. \tag{79}$$

As cited, the kernel hardware for the recursive type-III discrete cosine/sine transform device 120 and the recursive type-II discrete cosine/sine transform device 140 in the invention can support the DCT-IV/DCT-II/DCTIII/DST-II/DST-III operations concurrently and merge the pre- and post-processing operations for the first permutation device 110 and the second permutation device 150 to implement the IMDCT/MDCT/AQMF/SQMF operations to thereby gain the co-architecture design of analysis and synthesis filter-banks. Therefore, the operational period is relatively improved, as compared with other recursive algorithms.

Although the present invention has been explained in relation to its preferred embodiment, it is to be understood that many other possible modifications and variations can be made without departing from the spirit and scope of the invention as hereinafter claimed.

What is claimed is:

1. A recursive type-IV discrete cosine transform system, comprising:
    a first permutation device for receiving N digital input signals and performing a two-dimensional order permutation operation on the N digital signals to generate N two-dimensional first temporal signals, where N is a positive integer;
    a recursive type-III discrete cosine/sine transform device which is an m-point recursive type-III discrete cosine/sine transform device connected to the first permutation device for receiving the N first temporal signals and repeating a type-III discrete cosine/sine transform c times on the N first temporal signals to generate c second temporal signals each with m points, where N=m×c, and m, c are each a positive integer;
    a cosine/sine factor generation device connected to the recursive type-III discrete cosine/sine transform device for sequentially performing cosine/sine factor multiplication and corresponding addition operations on the m-point second temporal signals to generate c third temporal signals each with m points;
    a recursive type-II discrete cosine/sine transform device which is a c-point recursive type-II discrete cosine/sine transform device connected to the cosine/sine factor generation device for receiving the third temporal signals and repeating a type-II discrete cosine/sine transform m times to generate m fourth temporal signals each with c points; and
    a second permutation device connected to the recursive type-II discrete cosine/sine transform device for receiving the fourth temporal signals and performing a one-dimensional order permutation operation on the fourth temporal signals for generating N one-dimensional output signals,
    wherein the N one-dimensional output signals are obtained by performing a type-IV discrete cosine transform on the N digital input signals.

2. The recursive type-IV discrete cosine transform system as claimed in claim 1, wherein the recursive type-III discrete cosine/sine transform device is implemented in a common hardware architecture.

3. The recursive type-IV discrete cosine transform system as claimed in claim 2, wherein a computational period of the recursive type-III discrete cosine/sine transform device comprises m×(m+1)/2 cycles.

4. The recursive type-IV discrete cosine transform system as claimed in claim 3, wherein the recursive type-II discrete cosine/sine transform device is implemented in a common hardware architecture.

5. The recursive type-IV discrete cosine transform system as claimed in claim 4, wherein a computational period of the recursive type-II discrete cosine/sine transform device comprises c×(c+1)/2 cycles.

6. The recursive type-IV discrete cosine transform system as claimed in claim 5, wherein the recursive type-III discrete cosine/sine transform device comprises first to sixth registers, first to fifth adders, a first 3-to-1 multiplexer, a second 3-to-1 multiplexer, a first multiplier, a second multiplier, and a fourth multiplier.

7. The recursive type-IV discrete cosine transform system as claimed in claim 6, wherein the recursive type-II discrete cosine/sine transform device comprises seventh to twelfth registers, sixth to tenth adders, a third 3-to-1 multiplexer, a fourth 3-to-1 multiplexer, a third multiplier, a fifth multiplier, a sixth multiplier, a seventh multiplier, and an eighth multiplier.

8. A recursive type-IV discrete cosine transform system, comprising:
    a first permutation device for receives N digital input signals and performing a two-dimensional order permutation operation on the N digital signals to generate N two-dimensional first temporal signals, where N is a positive integer;
    a modified recursive type-III discrete cosine/sine transform device connected to the first permutation device and having a first and a second operational modes such that in the first operational mode a type-III discrete cosine/sine transform is repeated c times on the N first temporal signals for generating c second temporal signals each with m points, where N=m×c, and m, c are each a positive integer;
    a recursive type-II discrete cosine/sine transform device connected to the modified recursive type-III discrete cosine/sine transform device and having a first and a second operational modes such that in the first operational mode a third temporal signal is received and a type-II discrete cosine/sine transform is repeated m times on the third temporal signal for generating m fourth temporal signals each with c points; and a second permutation device connected to the recursive type-II discrete cosine/sine transform device for receiving the fourth temporal signals and performing a one-dimensional order permutation operation on the fourth temporal signals to generate N one-dimensional output signals, wherein the N one-dimensional output signals are obtained by performing a type-IV discrete cosine transform on the N digital input signals.

9. The recursive type-IV discrete cosine transform system as claimed in claim 8, wherein, in the second operational mode, the recursive type-III discrete cosine/sine transform device and the recursive type-II discrete cosine/sine transform device sequentially perform cosine/sine factor multiplication and corresponding addition operations on the c second temporal signals for generating c third temporal signals each with m points.

10. The recursive type-IV discrete cosine transform system as claimed in claim 9, wherein the recursive type-III discrete cosine/sine transform device comprises first to sixth registers, first to fifth adders, a first 3-to-1 multiplexer, a second 3-to-1 multiplexer, a first multiplier, a second multiplier, and a fourth multiplier.

11. The recursive type-IV discrete cosine transform system as claimed in claim 10, wherein the recursive type-II discrete cosine/sine transform device comprises seventh to twelfth registers, sixth to tenth adders, a third 3-to-1 multiplexer, a fourth 3-to-1 multiplexer, a third multiplier, a fifth multiplier, a sixth multiplier, a seventh multiplier, and an eighth multiplier.

* * * * *